United States Patent
Lee

(10) Patent No.: US 11,561,715 B2
(45) Date of Patent: Jan. 24, 2023

(54) METHOD AND APPARATUS FOR PRESEARCHING STORED DATA

(71) Applicant: Netlist, Inc., Irvine, CA (US)

(72) Inventor: Hyun Lee, Ladera Ranch, CA (US)

(73) Assignee: Netlist, inc., Irvine, CA (US)

( * ) Notice: Subject to any disclaimer, the term of this patent is extended or adjusted under 35 U.S.C. 154(b) by 142 days.

(21) Appl. No.: 16/950,731

(22) Filed: Nov. 17, 2020

(65) Prior Publication Data

US 2021/0141555 A1 May 13, 2021

Related U.S. Application Data

(63) Continuation of application No. 14/834,395, filed on Aug. 24, 2015, now Pat. No. 10,838,646, which is a (Continued)

(51) Int. Cl.
*G06F 3/06* (2006.01)
*G06F 13/10* (2006.01)
(Continued)

(52) U.S. Cl.
CPC .......... *G06F 3/0647* (2013.01); *G06F 3/0613* (2013.01); *G06F 3/0656* (2013.01); *G06F 3/0685* (2013.01); *G06F 12/0246* (2013.01); *G06F 12/0638* (2013.01); *G06F 13/10* (2013.01); *G06F 13/28* (2013.01); *G06F 3/0688* (2013.01); *G06F 12/0868* (2013.01);
(Continued)

(58) Field of Classification Search
None
See application file for complete search history.

(56) References Cited

U.S. PATENT DOCUMENTS 2,043,099 A 6/1936 Hanna
3,562,555 A 2/1971 Ahrons
(Continued)

FOREIGN PATENT DOCUMENTS

CN 102723099 A 10/2012
EP 0428330 A2 5/1991
(Continued)

OTHER PUBLICATIONS

"240pin DDR2 MetaSDRAM Registered DIMM based on 1 GB version C", Hynix Semiconductor, Product Description Rev. 0.2, Sep. 2008, 32 pages.
(Continued)

*Primary Examiner* — Yaima Rigol
(74) *Attorney, Agent, or Firm* — USCH Law, PC

(57) ABSTRACT

A memory module comprises a volatile memory subsystem, a non-volatile memory subsystem, and a module controller coupled to the volatile memory subsystem and to the non-volatile memory subsystem. The module controller is configurable to control data transfers between the volatile memory subsystem and the non-volatile memory subsystem. The module controller includes a data selection circuit configurable to pre-search data transferred from the non-volatile memory with respect to one or more search criteria before providing the pre-select data relevant to the one or more search criteria to the volatile memory subsystem.

20 Claims, 12 Drawing Sheets

Related U.S. Application Data continuation-in-part of application No. 14/706,873, filed on May 7, 2015, now Pat. No. 10,198,350, which is a continuation-in-part of application No. 14/536,588, filed on Nov. 7, 2014, now Pat. No. 10,380,022.

(60) Provisional application No. 62/150,272, filed on Apr. 20, 2015, provisional application No. 62/067,411, filed on Oct. 22, 2014, provisional application No. 62/056,469, filed on Sep. 26, 2014, provisional application No. 62/041,024, filed on Aug. 22, 2014, provisional application No. 61/989,941, filed on May 7, 2014, provisional application No. 61/929,942, filed on Jan. 21, 2014, provisional application No. 61/901,439, filed on Nov. 7, 2013.

(51) Int. Cl.
*G06F 12/02* (2006.01)
*G06F 13/28* (2006.01)
*G06F 12/06* (2006.01)
*G06F 12/0868* (2016.01)

(52) U.S. Cl.
CPC .............. *G06F 2206/1014* (2013.01); *G06F 2212/205* (2013.01); *G06F 2212/214* (2013.01); *G06F 2212/313* (2013.01); *G06F 2212/7203* (2013.01)

(56) References Cited

U.S. PATENT DOCUMENTS

| | | | |
|---|---|---|---|
| 3,916,390 A | 10/1975 | Chang et al. | |
| 4,234,920 A | 11/1980 | Van Ness et al. | |
| 4,420,821 A | 12/1983 | Hoffman | |
| 4,449,205 A | 5/1984 | Hoffman | |
| 4,965,828 A | 10/1990 | Ergott, Jr. et al. | |
| 5,430,742 A | 7/1995 | Jeddeloh et al. | |
| 5,519,663 A | 5/1996 | Harper, Jr. et al. | |
| 5,519,831 A | 5/1996 | Holzhammer | |
| 5,563,839 A | 10/1996 | Herdt et al. | |
| 5,577,213 A | 11/1996 | Avery et al. | |
| 5,619,644 A | 4/1997 | Crockett et al. | |
| 5,675,725 A | 10/1997 | Malcolm | |
| 5,758,149 A | 5/1998 | Bierma et al. | |
| 5,870,350 A | 2/1999 | Bertin et al. | |
| 5,874,995 A | 2/1999 | Naimpally et al. | |
| 5,890,192 A | 3/1999 | Lee et al. | |
| 5,953,215 A | 9/1999 | Karabatsos | |
| 6,023,421 A | 2/2000 | Clinton et al. | |
| 6,026,465 A | 2/2000 | Mills et al. | |
| 6,065,092 A | 5/2000 | Roy | |
| 6,112,310 A | 8/2000 | Jun et al. | |
| 6,145,068 A | 11/2000 | Lewis | |
| 6,158,015 A | 12/2000 | Klein | |
| 6,199,142 B1 | 3/2001 | Saulsbury et al. | |
| 6,216,247 B1 | 4/2001 | Creta et al. | |
| 6,269,382 B1 | 7/2001 | Cabrera et al. | |
| 6,336,174 B1 | 1/2002 | Li et al. | |
| 6,336,176 B1 | 1/2002 | Leyda et al. | |
| 6,421,279 B1 | 7/2002 | Tobita et al. | |
| 6,459,647 B1 | 10/2002 | Kengeri | |
| 6,487,102 B1 | 11/2002 | Halbert et al. | |
| 6,487,623 B1 | 11/2002 | Emerson et al. | |
| 6,571,244 B1 | 5/2003 | Larson | |
| 6,614,685 B2 | 9/2003 | Wong | |
| 6,658,507 B1 | 12/2003 | Chan | |
| 6,691,209 B1 | 2/2004 | O'Connell | |
| 6,721,860 B2 | 4/2004 | Klein | |
| 6,769,081 B1 | 7/2004 | Parulkar | |
| 6,799,241 B2 | 9/2004 | Kahn et al. | |
| 6,799,244 B2 | 9/2004 | Tanaka et al. | |
| 6,816,982 B2 | 11/2004 | Ravid | |
| 6,944,042 B2 | 9/2005 | Komatsuzaki | |
| 6,948,029 B2 | 9/2005 | Yano | |
| 6,952,368 B2 | 10/2005 | Miura et al. | |
| 7,053,470 B1 | 5/2006 | Sellers et al. | |
| 7,089,412 B2 | 8/2006 | Chen | |
| 7,102,391 B1 | 9/2006 | Sun et al. | |
| 7,111,142 B2 | 9/2006 | Spencer et al. | |
| 7,155,627 B2 | 12/2006 | Matsui | |
| 7,200,021 B2 | 4/2007 | Raghuram | |
| 7,234,099 B2 | 6/2007 | Gower et al. | |
| 7,353,325 B2 | 4/2008 | Lofgren et al. | |
| 7,409,491 B2 | 8/2008 | Doblar et al. | |
| 7,409,590 B2 | 8/2008 | Moshayedi et al. | |
| 7,411,859 B2 | 8/2008 | Sohn et al. | |
| 7,421,552 B2 | 9/2008 | Long | |
| 7,467,251 B2 | 12/2008 | Park et al. | |
| 7,554,855 B2 | 6/2009 | Kim | |
| 7,600,142 B2 | 10/2009 | Ichikawa | |
| 7,716,411 B2 | 5/2010 | Panabaker et al. | |
| 7,818,488 B2 | 10/2010 | Park et al. | |
| 8,086,955 B2 | 12/2011 | Zhou et al. | |
| 8,102,614 B2 | 1/2012 | Song et al. | |
| 8,233,303 B2 | 7/2012 | Best et al. | |
| 8,407,395 B2 | 3/2013 | Kim et al. | |
| 8,412,879 B2 | 4/2013 | Chang et al. | |
| 9,336,135 B1 | 5/2016 | Salessi et al. | |
| 9,405,684 B1 | 8/2016 | Derbeko et al. | |
| 2002/0083368 A1 | 6/2002 | Abe et al. | |
| 2002/0199061 A1 | 12/2002 | Friedman et al. | |
| 2003/0028733 A1 | 2/2003 | Tsunoda et al. | |
| 2003/0158995 A1 | 8/2003 | Lee | |
| 2004/0010473 A1 | 1/2004 | Hsu | |
| 2004/0017630 A1 | 1/2004 | Akagi | |
| 2004/0049629 A1 | 3/2004 | Miura et al. | |
| 2004/0088508 A1 | 5/2004 | Ballard | |
| 2004/0163027 A1 | 8/2004 | Maclaren | |
| 2004/0190210 A1 | 9/2004 | Leete | |
| 2005/0044302 A1 | 2/2005 | Pauley | |
| 2005/0060488 A1 | 3/2005 | Poechmueller | |
| 2005/0132250 A1 | 6/2005 | Hansen et al. | |
| 2005/0141273 A1 | 6/2005 | Park | |
| 2005/0172074 A1 | 8/2005 | Sinclair | |
| 2005/0249011 A1 | 11/2005 | Maeda | |
| 2005/0273548 A1 | 12/2005 | Roohparvar | |
| 2005/0280623 A1 | 12/2005 | Tani et al. | |
| 2006/0039197 A1 | 2/2006 | Khouri et al. | |
| 2006/0069896 A1 | 3/2006 | Sanders | |
| 2006/0075057 A1 | 4/2006 | Gildea et al. | |
| 2006/0080515 A1 | 4/2006 | Spiers et al. | |
| 2006/0212651 A1 | 9/2006 | Ashmore | |
| 2006/0230032 A1 | 10/2006 | Brankov | |
| 2006/0294295 A1 | 12/2006 | Fukuzo | |
| 2007/0070669 A1 | 3/2007 | Tsern | |
| 2007/0130416 A1 | 6/2007 | Yada | |
| 2007/0136523 A1 | 6/2007 | Bonella | |
| 2007/0174602 A1 | 7/2007 | Kao | |
| 2007/0192627 A1 | 8/2007 | Oshikiri | |
| 2007/0226412 A1 | 9/2007 | Morino et al. | |
| 2008/0080261 A1 | 4/2008 | Shaeffer et al. | |
| 2008/0104344 A1 | 5/2008 | Shimozono | |
| 2008/0195806 A1 | 8/2008 | Cope | |
| 2009/0031099 A1 | 1/2009 | Sartore | |
| 2009/0113158 A1 | 4/2009 | Schnell | |
| 2009/0201709 A1* | 8/2009 | Inoue .................... | G11C 15/04 365/49.1 |
| 2009/0327578 A1 | 12/2009 | Cagno et al. | |
| 2010/0110748 A1 | 5/2010 | Best | |
| 2010/0188883 A1 | 7/2010 | Chen et al. | |
| 2010/0274953 A1 | 10/2010 | Lee et al. | |
| 2011/0211593 A1 | 9/2011 | Pepper | |
| 2011/0320804 A1 | 12/2011 | Chan et al. | |
| 2012/0072683 A1 | 3/2012 | Iliadis | |
| 2012/0082018 A1 | 4/2012 | Gushima | |
| 2012/0110036 A1 | 5/2012 | Rabii | |
| 2012/0204079 A1 | 8/2012 | Takefman et al. | |
| 2012/0215965 A1 | 8/2012 | Inada et al. | |
| 2012/0254504 A1 | 10/2012 | Syu et al. | |
| 2012/0271990 A1 | 10/2012 | Chen et al. | |
| 2012/0278543 A1 | 11/2012 | Yu et al. | |
| 2013/0013853 A1 | 1/2013 | Yeh | |

(56) References Cited

U.S. PATENT DOCUMENTS

| | | |
|---|---|---|
| 2013/0019076 A1 | 1/2013 | Amidi et al. |
| 2013/0286737 A1 | 10/2013 | Im |
| 2013/0346671 A1 | 12/2013 | Michael et al. |
| 2014/0059170 A1 | 2/2014 | Gasparakis |
| 2014/0108702 A1 | 4/2014 | Mizushima |
| 2014/0229669 A1 | 8/2014 | Sandstrom |
| 2014/0244923 A1 | 8/2014 | Ware |
| 2014/0269088 A1 | 9/2014 | Pichen |
| 2015/0003175 A1 | 1/2015 | Ramanujan |
| 2015/0052114 A1 | 2/2015 | Curewitz et al. |

FOREIGN PATENT DOCUMENTS

| | | |
|---|---|---|
| EP | 2737383 A2 | 6/2014 |
| WO | WO2008139441 A2 | 11/2008 |
| WO | WO2012148812 A2 | 11/2012 |
| WO | WO2013016723 A3 | 1/2013 |

OTHER PUBLICATIONS

"MetaRAM Develops New Technology That Quadruples Memory Capacity of Servers and Workstations; Reduces Price by Up to 90 Percent", Press Release provided by MetaRAM and published on MarketWired.com, Feb. 25, 2008, 3 pages.
"Out of Stealth Mode, Start-Up MetaRAM Unveils New Technology That Quadruples DRAM Capacity", Press Release edited by Storage Newsletter on Feb. 28, 2008 at StorageNewsLetler.com, 8 pages.
"Using Two Chip Selects to Enable Quad Rank", an IP.com Prior Art Database Technical Disclosure, IP.com Electronic Publication: Dec. 17, 2005, 2 pages.
Advisory Action in U.S. Appl. No. 12/240,916, dated Mar. 13, 2012.
Amendment and Reply to Office Action in U.S. Appl. No. 13/536,173, dated May 21, 2013.
American National Standard Dictionary of Electrical and Electrical Terms, IEEE, Fourth Edition, Revised, ANSIEEE Std 100-1988, Institute of Electrical Engineers, Nov. 3, 1988, pp. 215, 722, 964 and 1103.
Bruce. J., "Synchronous DRAM Architectures, Organizations, and Alternate Technologies", Electrical and Computer Engineering Dept., Univ. of Maryland, Dec. 10, 2002, 22 pages.
David, H. et al., "Fully Buffered DIMM (FB-DIMM) Design Considerations", Intel Developer Forum, Intel Corp., Feb. 18, 2004, 36 pages.
Diablo Technologies, Inc.'s Invalidity Contentions, Case No. 13-CV-05889 YGR, dated Jun. 6, 2014.
Horowitz, P. et al., "The Art of Electronics", Cambridge University Press 2nd Ed. 1989, pp. 471,495-496.
Innis, J., "MPC8560 PowerQUICC III Compact Flash Interface Design", Freescale Semiconductor, Inc., 2004-2006, pp. 1-23.
Inter Partes Review Case No. IPR2014-00982, Decision Denying Request for Rehearing, issued May 21, 2015.
Inter Partes Review Case No. IPR2014-00982, Decision-Denying Institution of Inter Partes Review 37 C.F.R. 42.108, issued Dec. 22, 2014.
Inter Partes Review Case No. IPR2014-00982, Exhibit 1013 to Petition for Inter Partes Review, "Declaration of Dr. Paul Min," filed on Jun. 19, 2014.
Inter Partes Review Case No. IPR2014-00982, Patent Owner's Preliminary Response, filed Sep. 26, 2014.
Inter Partes Review Case No. IPR2014-00982, Petition for Inter Partes Review of U.S. Pat. No. 8,516,187, filed on Jun. 19, 2014.
Inter Partes Review Case No. IPR2014-00982, Rehearing Request, filed Jan. 15, 2015.
Inter Partes Review Case No. IPR2014-00994, Decision Denying Request for Rehearing, issued May 21, 2015.
Inter Partes Review Case No. IPR2014-00994, Decision-Denying Institution of Inter Partes Review-37 CFR 42.108, issued Dec. 16, 2014.
Inter Partes Review Case No. IPR2014-00994, Patent Owner's Preliminary Response, filed on Oct. 2, 2014.
Inter Partes Review Case No. IPR2014-00994, Rehearing Request, filed on Jan. 15, 2015.
Inter Partes Review Case No. IPR2014-01370, Decision-Denying Institution of Inter Partes Review 37 C.F.R. 42.108, issued Mar. 13, 2015.
Inter Partes Review Case No. IPR2014-01370, Exhibit 1002 to Petition for Inter Partes Review, "Declaration of Dr. Nader Bagherzadah," filed on Aug. 23, 2014.
Inter Partes Review Case No. IPR2014-01370, Exhibit 1017 "Webster's II New College Dictionary," filed on Sep. 22, 2014.
Inter Partes Review Case No. IPR2014-01370, Exhibit 2002 to Petition for Inter Partes Review, "Standard Dictionary of Electrical and Electronics Terms," IEEE 1988, filed on Aug. 23, 2014.
Inter Partes Review Case No. IPR2014-01370, Patent Owner's Exhibit List, filed on Dec. 18, 2014.
Inter Partes Review Case No. IPR2014-01370, Patent Owner's Preliminary Response, filed on Dec. 18, 2014.
Inter Partes Review Case No. IPR2014-01371, Decision-Denying Institution of Inter Partes Review 37 C.F.R., 42.108, issued on Mar. 13, 2015.
Inter Partes Review Case No. IPR2014-01371, Exhibit 1005 to Petition for Inter Partes Review, "Die BIOS Optimization Guide Rev. 6.2," Adrian Wong 1988, filed on Aug. 23, 2014.
Inter Partes Review Case No. IPR2014-01371, Exhibit 1006 to Petition for Inter Partes Review, "JEDEC Standard No. 21-C Release 9," JEDEC Solid State Technology Association, Aug. 1999, filed Aug. 23, 2014.
Inter Partes Review Case No. IPR2014-01371, Exhibit 1010 to Petition for Inter Partes Review, "MPC8560 PowerQUICC III Compact Flash Interface Design," Freescale Semiconductor Application Note, Dec. 2006, filed Aug. 23, 2014.
Inter Partes Review Case No. IPR2014-01371, Patent Owners Exhibit List, filed on Dec. 18, 2014.
Inter Partes Review Case No. IPR2014-01371, Patent Owners Preliminary Response, filed on Dec. 18, 2014.
Inter partes review Case No. IPR2017-00649, Exhibit 1003 "Declaration of Ron Maltiel Regarding U.S. Pat. No. 8,301,833", filed Jan. 13, 2017.
Inter partes review Case No. IPR2017-00649, Exhibit 1006 "U.S. Appl. No. 60/749,267", filed Jan. 13, 2017.
Inter partes review Case No. IPR2017-00649, Exhibit 1010 "JEDEC Standard", filed Jan. 13, 2017.
Inter partes review Case No. IPR2017-00649, Exhibit 1012 "1.8 Volt Intel StrataFlash Wireless Memory (L18)", filed Jan. 13, 2017.
Inter partes review Case No. IPR2017-00649, Exhibit 1014 "JEDEC Standard Double Data Rate (DDR) SDRAM Specification JESD79", filed Jan. 13, 2017.
Inter partes review Case No. IPR2017-00649, Exhibit 1017 "Computer Organization & Design", filed Jan. 13, 2017.
Inter partes review Case No. IPR2017-00649, Exhibit 1020 "Microsoft Computer Dictionary Fifth Edition", filed Jan. 13, 2017.
Inter partes review Case No. IPR2017-00649, Exhibit 1021 "Microsoft Windows 2000 Professional Resource Kit", filed Jan. 13, 2017.
Inter partes review Case No. IPR2017-00649, Exhibit 1023 "Designing Embedded Hardware", filed Jan. 13, 2017.
Inter partes review Case No. IPR2017-00649, Exhibit 1023 "Designing Embedded Hardware", tiled Jan. 13, 2017.
Inter partes review Case No. IPR2017-00649, Exhibit 1024 "A 1.8-V 128-Mb 125-MHz Multilevel Cell Flash Memory With Flexible Read While Write", filed Jan. 13, 2017.
Inter partes review Case No. IPR2017-00649, Petition for Inter Partes Review of U.S. Pat. No. 3,301,833 filed Jan. 13, 2017.
Inter partes review Case No. IPR2017-00649, Petition for Inter Paries Review of U.S. Pat. No. 8,301,833 filed Jan. 13, 2017.
Inter partes review Case No. IPR2017-00692, Exhibit 1003 "Declaration of Ron Maltiel Regarding U.S. Pat. No. 8,874,831", filed Jan. 17, 2017.
Inter partes review Case No. IPR2017-00692, Exhibit 1005 "U.S. Appl. No. 60/941,586", filed Jan. 17, 2017.
Inter partes review Case No. IPR2017-00692, Exhibit 1007 "U.S. Appl. No. 60/912,321", filed Jan. 17, 2017.

(56) References Cited

OTHER PUBLICATIONS

Inter partes review Case No. IPR2017-00692, Petition for Inter Partes Review of U.S. Pat. No. 3,874,831, filed Jan. 17, 2017.
Inter partes review Case No. IPR2017-00692, Petition for Inter Paries Review of U.S. Pat. No. 8,874,831, filed Jan. 17, 2017.
Inter Partes Review of U.S. Pat. No. 8,516,187, IPR Case No. IPR2014-00994, Petition for Inter Partes Review, filed on Jun. 20, 2014.
Inter Partes Review of U.S. Pat. No. 8,516,187, IPR Case No. IPR2014-01371, Corrected Petition for Inter Partes Review, filed on Sep. 22. 2014.
Inter Partes Review of U.S. Pat. No. 8,874,831, Case No. IPR2017-00692, Exhibhit 2013 Search on Amazon website for "memory module", Filed Nov. 10, 2017.
Inter Partes Review of U.S. Pat. No. 8,874,831, Case No. IPR2017-00692, Exhibit 1017 "JESD79-2B", filed Jan. 17, 2017.
Inter Partes Review of U.S. Pat. No. 8,874,831, Case No. IPR2017-00692, Exhibit 2001, Excerpts from Microsoft Dictionary Fifth Edition (2002), filed May 1, 2017.
Inter Partes Review of U.S. Pat. No. 8,874,831, Case No. IPR2017-00692, Exhibit 2002, Excerpts from The New Oxford Dictionary Second Edition (2005), filed May 1, 2017.
Inter Partes Review of U.S. Pat. No. 8,874,831, Case No. IPR2017-00692, Exhibit 2003, Excerpts from Merriam-Webster's Collegiate Dictionary Eleventh Edition (2003), filed May 1, 2017.
Inter Partes Review of U.S. Pat. No. 8,874,831, Case No. IPR2017-00692, Exhibit 2005 Excerpts from Memory Systems (Jacob), Filed Nov. 10, 2017.
Inter Partes Review of U.S. Pat. No. 8,874,831, Case No. IPR2017-00692, Exhibit 2010 Deposition transcript of Ron Maltiel, Filed Nov. 10, 2017.
Inter Partes Review of U.S. Pat. No. 8,874,831, Case No. IPR2017-00692, Exhibit 2011 Stanford's Materials Science department website, Filed Nov. 10, 2017.
Inter Partes Review of U.S. Pat. No. 8,874,831, Case No. IPR2017-00692, Exhibit 2012 Webpage from Ben-Gurion University's Materials Science department website, Filed Nov. 10, 2017.
Inter Partes Review of U.S. Pat. No. 8,874,831, Case No. IPR2017-00692, Exhibit 2014 Kingston press release from Oct. 11, 2005, Filed Nov. 10, 2017.
Inter Partes Review of U.S. Pat. No. 8,874,831, Case No. IPR2017-00692, Exhibit 2015 Decision of the U.S. Court of Appeals Case No. 2016-1742, Filed Nov. 10, 2017.
Inter Partes Review of U.S. Pat. No. 8,874,831, Case No. IPR2017-00692, Exhibit 2019 IPR2017-00649, paper 7, denying institution, filed Nov. 10, 2017.
Inter Partes Review of U.S. Pat. No. 8,874,831, Case No. IPR2017-00692, Exhibit 2020 IPR2017-00649, paper 8, rehearing request, Filed Nov. 10, 2017.
Inter Partes Review of U.S. Pat. No. 8,874,831, Case No. IPR2017-00692, Exhibit 2021 IPR2014-00882, Paper 33, FWD, Filed Nov. 10, 2017.
Inter Partes Review of U.S. Pat. No. 8,874,831, Case No. IPR2017-00692, Exhibit 2022 JEDEC Standard, JESD205 (2007), Filed Nov. 10, 2017.
Inter Partes Review of U.S. Pat. No. 8,874,831, Case No. IPR2017-00692, Exhibit 2023 Deposition transcript of Dr. Mazumder (IPR2017-00560, -561, -562), Filed Nov. 10, 2017.
Inter Partes Review of U.S. Pat. No. 8,874,831, Case No. IPR2017-00692, Exhibit 2024 M-Systems DiskOnChip Millennium Plus Data Sheet, Filed Nov. 10, 2017.
Inter Partes Review of U.S. Pat. No. 8,874,831, Case No. IPR2017-00692, Exhibit 2025 Excerpts from Merriam-Webster's (2006), Filed Nov. 10, 2017.
Inter Partes Review of U.S. Pat. No. 8,874,831, Case No. IPR2017-00692, Exhibit 2026 Excerpts from Memory Systems (Jacob), Filed Nov. 10, 2017.
Inter Partes Review of U.S. Pat. No. 8,874,831, Case No. IPR2017-00692, Patent Owner's Notice of Deposition of Ron Maltiel, filed Aug. 30, 2017.
Inter Partes Review of U.S. Pat. No. 8,874,831, Case No. IPR2017-00692, Patent Owner's Objections to Evidence, Filed Aug. 4, 2017.
Inter Partes Review of U.S. Pat. No. 8,874,831, Case No. IPR2017-00692, Patent Owner's Preliminary Response, filed May 1, 2017.
Inter Partes Review of U.S. Pat. No. 8,874,831, Case No. IPR2017-00692, Patent Owner's Response, Filed Nov. 10, 2017.
Inter Partes Review of U.S. Pat. No. 8,874,831, Case No. IPR2017-00692, Petitioner's Objections to Evidence, Filed Nov. 17, 2017.
Inter Partes Review of U.S. Pat. No. 8,874,831, Case No. IPR2017-00692, Trial Instituted Document, filed Jul. 21, 2017.
Inter Partes Review U.S. Pat. No. 8,301,833, IPR Case No. IPR2014-01370, Corrected Petition for Inter Partes Review, filed on Sep. 22, 2014.
International Preliminary Report on Patentability in PCTIUS12/48750, dated Apr. 3, 2014.
International Search Report and Written Opinion in PCT/U512/48750, dated Oct. 10, 2012.
International Search Report and Written Opinion in PCT/U52014/064698, dated Aug. 14, 2015.
International Search Report and Written Opinion in PCT/US12/48750, dated Oct. 10, 2012.
Jacob, B., "Memory Systems Cache, RAM, Disk", Morgan Kaufman Publishers, Burlington, MA, 2008, Preface and Ch. 7 pp. 315-322.
Jandhyala, S. et al., "Design-for-Test Analysis of a Buffered SDRAMIMM", Semiconductor Group, Texas Instruments, Proceedings of International Workshop in Memory Technology, Design and Testing, Singapore, Aug. 13014,1996,15 pages.
JEDEC Global Standards for the Microelectronics Industry, Standards http://www.jedec.org/standards-documents/about-jedec-standards (2014).
JEDEC Standard 21-C, "Configurations for Solid State Memories," pp. 4.5.5-1 to 4.5.5-18.
JEDEC Standard No. 21-C (Release 17), Annex J: Serial Presence Detects for DDR2 SDRAM (Rev. 1.3).
JEDEC Standard, "Configurations for Solid State Memories", JEDEC Standard 21-C, Release 9, Aug. 1999,114 pages.
JEDEC Standard, Double Data Rate (DDR): SDRAM Specification: JESD79C (Revision JESD79B), Mar. 2003, pp. 1-75.
JEDEC Standard, FBDIMM Specification:DR2 SDRAM Fully Buffered DIMM (FBDIMM) Design Specification: JESD205, JEDEC Solid State Tech. Assoc., Mar. 2007, pp. 1-129.
Lee, Final Office Action, U.S. Appl. No. 14/536,588, dated Jun. 8, 2018, 37 pgs.
Lee, Final Office Action, U.S. Appl. No. 14/706,873, dated Mar. 21, 2018, 34 pgs.
Lee, Notice of Allowance, U.S. Appl. No. 14/536,588, dated Mar. 7, 2019, 12 pgs.
Lee, Notice of Allowance, U.S. Appl. No. 14/706,873, dated Sep. 24, 2018, 9 pgs.
Lee, Notice of Allowance, U.S. Appl. No. 15/665,246, dated Nov. 14, 2018, 9 pgs.
Lee, Office Action, U.S. Appl. No. 14/536,588, dated Aug. 25, 2016, 21 pgs.
Lee, Office Action, U.S. Appl. No. 14/536,588, dated Jun. 20, 2017, 27 pgs.
Lee, Office Action, U.S. Appl. No. 15/665,246, dated Jun. 28, 2018, 16 pgs.
Micron Technology Inc., NAND Flash Memory, data sheet, © 2005, 58 pgs.
Mutnuary, B. et al., "Analysis of Fully Buffered DIMM Interface in High-speed Server Applications", IBM Corp, xSeries eServer Development, 2006 Electronic Components and Technology Conference, pp. 203-208.
Netlist, Inc., Communication Pursuant to Article 94(3), EP14860330-1, dated Apr. 19, 2018, 8 pgs.
Netlist, Inc., Extended European Search Report, EP14860330-1, dated Jun. 30, 2017, 16 gs.
Netlist, Inc., International Preliminary Report on Patentability, PCT/US2016/026874, dated Oct. 24, 2017, 8 pgs.
Netlist. Inc., International Search Report and Written Opinion, PCT/US2016/026874, dated Aug. 12, 2016, 9 pgs.

(56) References Cited

OTHER PUBLICATIONS

Notice of Allowance in U.S. Appl. No. 12/240,916, dated Sep. 17, 2012.
Notice of Allowance in U.S. Appl. No. 13/536,173, dated Jul. 2, 2013.
Notice of Allowance in U.S. Appl. No. 13/536,176, dated Aug. 4, 2014.
Notice of Allowance in U.S. Appl. No. 13/559,476, dated May 6, 2014.
Notice of Allowance in U.S. Appl. No. 14/489,269, dated Oct. 8, 2015.
Office Action in U.S. Appl. No. 12/240,916, dated Apr. 3, 2012.
Office Action in U.S. Appl. No. 12/240,916, dated Feb. 1, 2012.
Office Action in U.S. Appl. No. 12/240,916, dated Jul. 29, 2011.
Office Action in U.S. Appl. No. 13/536,173, dated Apr. 15, 2013.
Office Action in U.S. Appl. No. 13/625,563, dated Aug. 5, 2013.
Office Action in U.S. Appl. No. 13/625,563, dated May 9, 2014.
Office Action in U.S. Appl. No. 13/905,048, dated Aug. 1, 2013.
Office Action in U.S. Appl. No. 13/905,053, dated Aug. 1, 2013.
Office Action in U.S. Appl. No. 14/173,219, dated Mar. 13, 2014.
Office Action in U.S. Appl. No. 14/173,242, dated Mar. 14, 2014.
Petition for Inter Partes Review of U.S. Pat. No. 8,301,833 (on behalf of SanDisk, Corp.), filed Jun. 20, 2014.
Petition for Inter Partes Review of U.S. Pat. No. 8,301,833 (on behalf of SMART Modular Technologies, Inc.), filed Aug. 22, 2014.
Petition for Inter Partes Review of U.S. Pat. No. 8,516,187 (on behalf of SanDisk, Corp.), filed Jun. 19, 2014.
Petition for Inter Partes Review of U.S. Pat. No. 8,516,187 (on behalf of SMART Modular Technologies, Inc.), filed Aug. 22, 2014.
Smart Storage Systems, Inc's Invalidity Contentions, Case No. 4:13-cv-05889-YGR, dated Jun. 6, 2014.
U.S. District Court Northern District of California, Case No. 4:13-CV-05889-YGR, *Netlist, Inc.* v. *Smart Storage Systems, Inc., and Diablo Technologies, Inc.*, Diablo Technologies, Inc.'s Invalidity Contentions, dated Jun. 6, 2014.
U.S. District Court Northern District of California, Case No. 4:13-CV-05889-YGR, *Netlist, Inc.* v. *Smart Storage Systems. Inc., and Diablo Technologies, Inc.*, Exhibit H to "Diablo Technologies, Inc.'s Invalidity Contentions," dated Jun. 6, 2014.
U.S. District Court Northern District of California, Case No. 4:13-CV-05889-YGR, *Netlist, Inc.* v. *Smart Storage Systems. Inc., and Diablo Technologies, Inc.*, Exhibit H to "Smart Storage Systems, Inc.'s Invalidity Contentions," dated Jun. 6, 2014.
U.S. District Court Northern District of California, Case No. 4:13-CV-05889-YGR, *Netlist, Inc.* v. *Smart Storage Systems, Inc., and Diablo Technologies, Inc.*, Exhibits B-1 to B-7 to "Diablo Technologies, Inc.'s Invalidity Contentions," dated Jun. 6, 2014.
U.S. District Court Northern District of California, Case No. 4:13-CV-05889-YGR, *Netlist, Inc.* v. *Smart Storage Systems. Inc., and Diablo Technologies. Inc.*, Exhibits C.1-C.7 to "Smart Storage Systems, Inc.'s Invalidity Contentions," dated Jun. 6, 2014.
U.S. District Court Northern District of California, Case No. 4:13-CV-05889-YGR, *Netlist, Inc.* v. *Smart Storage Systems, Inc., and Diablo Technologies, Inc.*, Exhibits D.1-D.8 to "Smart Storage Systems. Inc.'s Invalidity Contentions," dated Jun. 6, 2014.
U.S. District Court Northern District of California, Case No. 4:13-CV-05889-YGR, *Netlist, Inc.* v. *Smart Storage Systems, Inc., and Diablo Technologies, Inc.*, Exhibits E-1 to E-7 to "Diablo Technologies. Inc.'s Invalidity Contentions," dated Jun. 6, 2014.
U.S. District Court. Northern District of California, Case No. 4:13-CV-05889-YGR, *Netlist, Inc.* v. *Smart Storage Systems, Inc., and Diablo Technologies, Inc.*, Smart Storage Systems, Inc.'s Invalidity Contentions, dated Jun. 6, 2014.
Webster's II New College Dictionary, Houghton Mifflin Company, Boston, MA, 2001, pp. 259, 1115.
Wong, A. "The BIOS Optimization Guide", Adrian's Rojak Pot, Rev. 6.2, 1998-2001, 67 pages.

* cited by examiner

METHOD AND APPARATUS FOR PRESEARCHING STORED DATA

CROSS REFERENCE TO RELATED APPLICATIONS

The present application is a continuation of U.S. patent application Ser. No. 14/834,395, filed Aug. 24, 2015, entitled "Method And Apparatus for Presearching Stored Data," which is a continuation-in-part of U.S. patent application Ser. No. 14/706,873, filed May 7, 2015 (U.S. Pat. No. 10,198,350), entitled "Memory Module and System and Method of Operation" which claims priority to U.S. Provisional Patent Application No. 62/150,272, filed Apr. 20, 2015, entitled "Hybrid Memory Module for Computer System," and which is a continuation-in-part of U.S. patent application Ser. No. 14/536,588, filed Nov. 7, 2014 (U.S. Pat. No. 10,380,022), entitled "Hybrid Memory Module and System and Method of Operating the Same," which claims priority to U.S. Provisional Patent Application No. 61/901,439, filed Nov. 7, 2013, entitled "Dynamic Random Access to Non-Volatile Memory," U.S. Provisional Patent Application No. 61/929,942, filed Jan. 21, 2014, entitled "Memory Channel Storage," U.S. Provisional Patent Application No. 61/989,941, filed May 7, 2014, entitled "High Density Hybrid Memory Systems," U.S. Provisional Patent Application No. 62/041,024, filed Aug. 22, 2014, entitled "Apparatus and Methods for Transferring Storage Content," U.S. Provisional Patent Application No. 62/056,469, filed Sep. 26, 2014, entitled "Memory Channel Storage," and U.S. Provisional Patent Application No. 62/067,411, filed Oct. 22, 2014, entitled "Hybrid Mobile Memory for Random Access." Each of the above applications is incorporated herein by reference in its entirety. The present application is related to U.S. Provisional Patent Application No. 61/512,871, filed Jul. 28, 2011, entitled "High Density DIMMs," and U.S. patent application Ser. No. 13/559,476, filed Jul. 26, 2012, entitled "Flash DRAM Hybrid Memory Module," each of which is incorporated herein by reference in its entirety.

FIELD

The disclosure herein is related generally to computer systems and memories, and more particularly to a method and apparatus for presearching stored data before loading data from data storage to computer system memory.

BACKGROUND

Computer systems such as network servers, personal computers, PDAs, mobile phones, video games, scientific instruments, industrial robotics, medical electronics, and so on, rely heavily on the capacity and throughput of their system or main memories and the speed of accessing them for optimal performance. A computer or server system typically includes a processing unit, a system bus, and memory subsystems coupled to the processor unit via the system bus or a network. The processing unit may include a central processing unit (CPU) or processor, a memory controller (MC), a direct data management controller (DMA), etc. The CPU, MC and DMA may be separate units coupled to each other via the system bus or other connections, or integrated into a same integrated circuit package. The memory subsystems may include one or more main memory subsystem (MMS) and one or more memory modules or storage.

In general, for cost/performance/power reasons, the memories in the computer/server system are arranged in layers such that faster and smaller memories are located within (or close) to processor cores (e.g., first layer cache), and density and access time increase as memory is physically and electronically further away from the core. The main memory is connected to the MC via a dedicated memory channel in the system bus, which provides dynamic random data access to the CPU and may include one or more dynamic random access memory (DRAM) modules. The storage usually includes very large memories in the system, such as hard disc devices (HDD), solid-state storage devices (SSD), etc., which are coupled to the processing unit via one or more data communication channels, such as one or more of a PCIe bus, an input/output I/O controller, and a local or remote network.

Transferring data within the computer or server system typically requires the CPU to read data from one memory and write the data into another memory. For example, when a process running on the CPU needs to access data stored in the memory modules, the CPU allocates certain amount of memory in the main memory and loads the data from the storage into the main memory for random access. For example, if the CPU is used to perform a search process for entries in a database that match certain criteria, and the database occupies a certain address range in a memory module, the CPU would need to load the data stored in the address range into the main memory. The address range may include multiple blocks or pages, and each entry in the database may be stored as a data segment within a block of page. The data may be transferred to the main memory one block at a time or using a series of operations to move multiple blocks at a time, and the CPU may search each block after it is loaded in main memory. Thus, the CPU would be occupied throughout the search process in which data in the address range is transferred and searched.

Moreover, in certain computer or server systems, data being transferred from the memory module to the main memory may go through an error correction code (ECC) process, during which the data from the memory module are checked for errors. If an error is found, the ECC process flags the data and generates an error code for error correction. The data, flag, and error code may be provided to the CPU as is, so that the CPU can complete the ECC process by correcting the error before the data is loaded into the main memory. Thus, the larger the amount of data being transferred to main memory, the more CPU time is required to move the data from the storage to the main memory.

DESCRIPTION OF THE EMBODIMENTS

Figure 1:
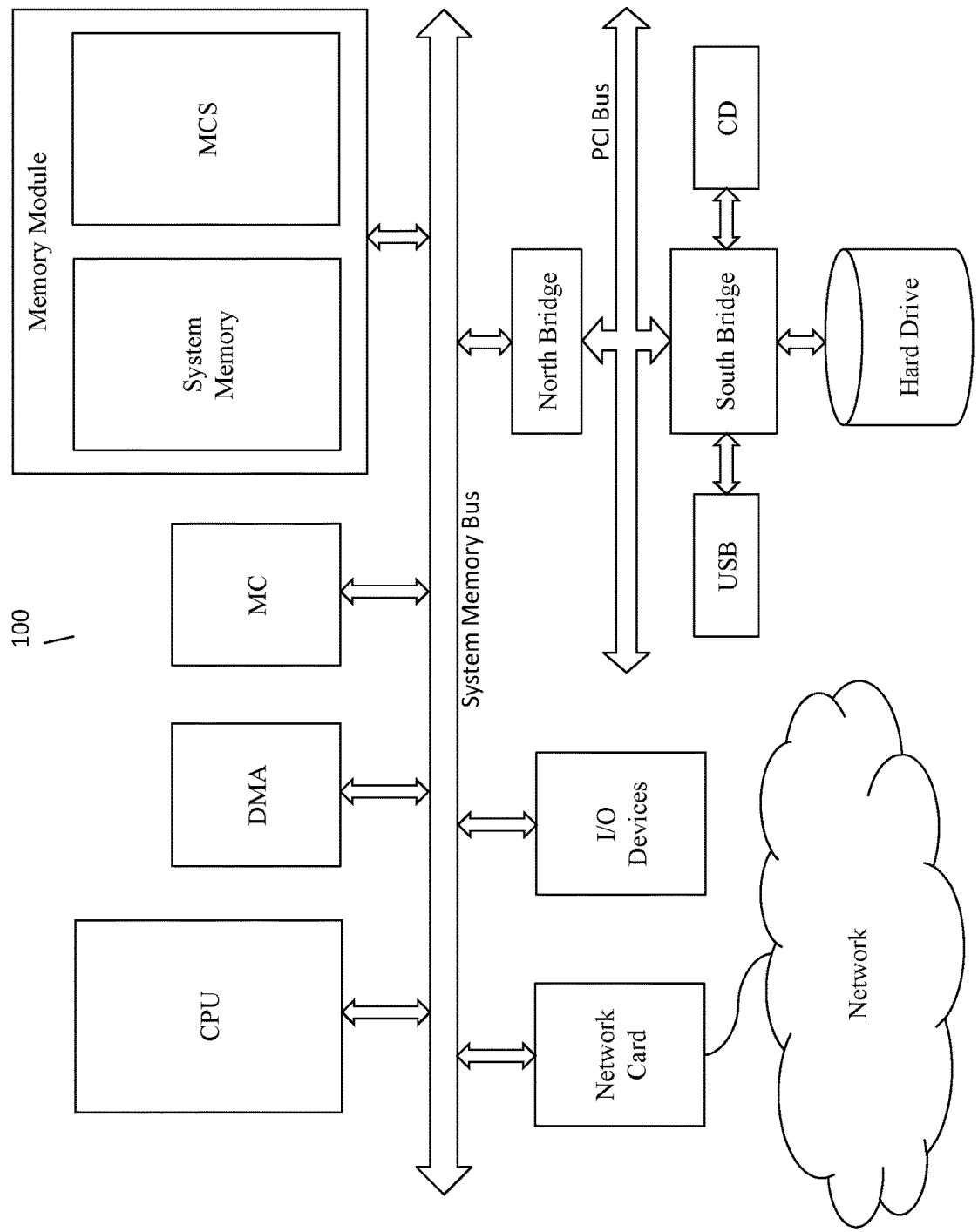
FIG. 1 is a diagrammatic representation of a computer or server system according to certain embodiments.

As shown in FIG. 1, a computer or server system (computer system) 100 according to certain embodiments includes a central processing unit (CPU) or processor, a memory controller (MC), a system memory bus, one or more memory modules coupled to the memory controller via the system memory bus. The one or more memory modules include one or more hybrid memory modules (e.g, the Hypervault™ (HV) memory modules provided by Netlist, Inc. of Irvine, Calif.) that provide a system memory, and may further provide memory channel storage (MCS). In certain embodiments, the MC may be integrated into the CPU. In further embodiments, the computer system may also include a direct data management controller (DMA) also coupled to the system bus. The CPU with or without the MC and/or the DMA, or the computer system 100 in part or in while, is sometimes referred to hereafter as the "System" or "system."

In certain embodiments, the computer system 100 may further include a network card and one or more I/O devices such as keyboard, monitor, touchscreen, microphone, speaker, etc. The network card may or may not be integrated into the CPU and provides network interface functions (wired or wireless) between the computer system 100 and local and/or wide area networks. The computer system 100 may further include a PCI bus, which is coupled to a north bridge, which is coupled to the memory controller via the memory bus or incorporated into the memory controller. One or more storage devices, such as a hard drive, a CD/DVD drive, and a USB drive, via a south bridge are coupled to the PCI bus.

Figure 2:
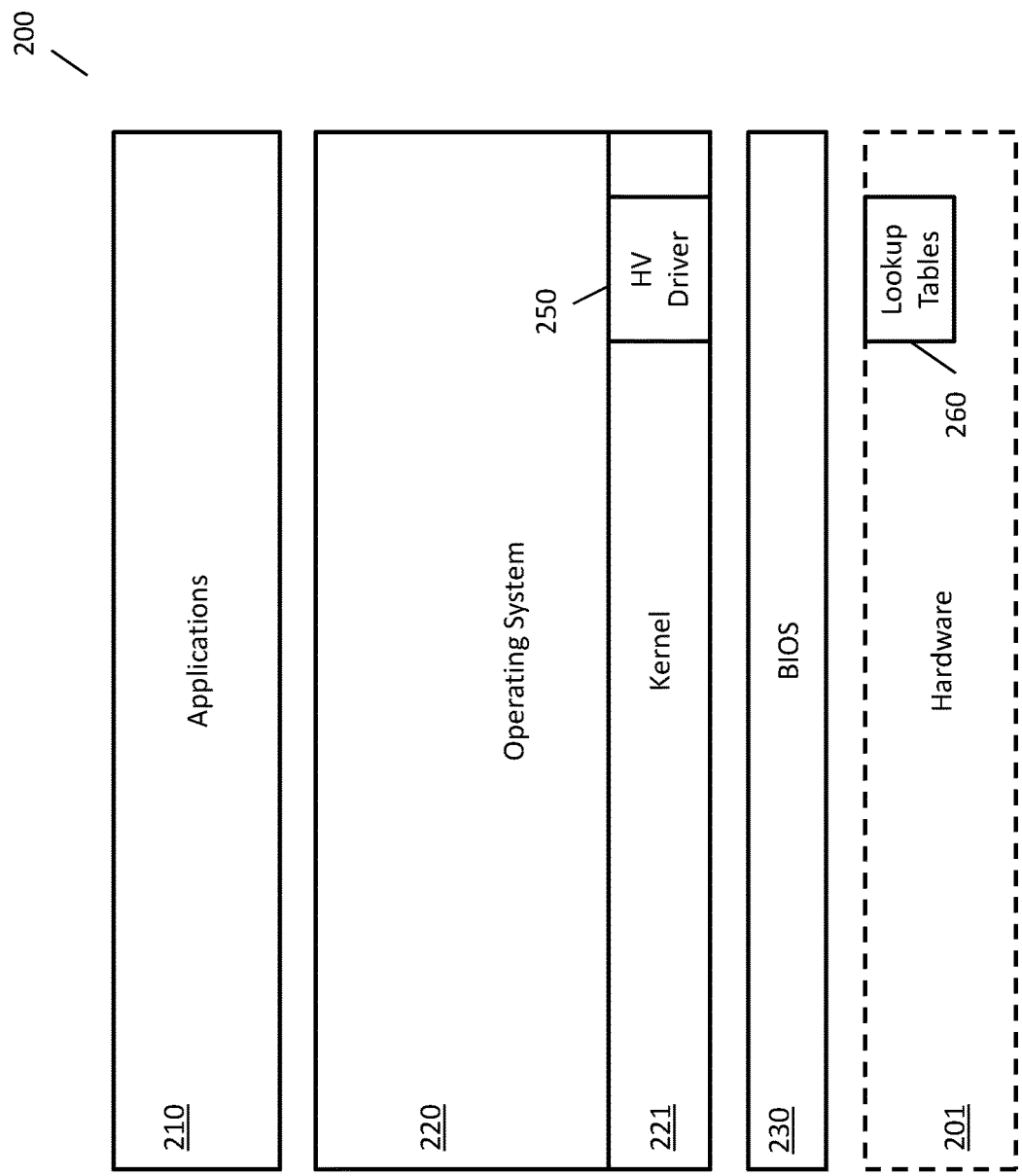
FIG. 2 is a diagrammatic representation of a software stack of the computer or server system according to certain embodiments.

In addition to the hardware components shown in FIG. 1, the computer system 100 also includes software/firmware components. In certain embodiments, the software/firmware components can be roughly represented as a stack of software/firmware layers 200 over a hardware layer 201. As shown in FIG. 2, the stack of software/firmware layers 200 includes an applications layer 210 sitting on an operating system layer 220. The applications 210 are software programs that perform specific tasks. The operating system 220 manages the hardware and software resources of the computer system 100 and acts as an intermediary between the application programs 210 and the hardware components of the computer system 100.

The operating system 220 includes a kernel 221, which are computer programs that manages input/output requests from other software programs (or processes), and which translates the requests into data processing instructions for the CPU and/or other hardware components of the computer system 100. The kernel can include an interrupt handler that handles all requests or completed I/O operations that compete for the kernel's services, a scheduler that determines which programs share the kernel's processing time in what order, and a supervisor that actually gives use of the computer to each process when it is scheduled. The kernel may also include a manager of the operating system's address spaces in memory or storage. The kernel's services are requested by other parts of the operating system or by applications through a specified set of program interfaces sometimes referred to as system calls.

Between the kernel and the hardware layer is the basic input/output system (BIOS) layer 230, which in certain embodiments is firmware stored in some sort of permanent memory (e.g., programmable read-only memory (PROM), or electrically programmable read-only memory (EPROM)), or Flash memory, and includes program codes for initializing and testing the system hardware components, and to load the operating system from a mass memory device when the computer system 100 is boot up. The BIOS may additionally provide an abstraction layer for the hardware components so as to provide a consistent way for application programs and operating systems to interact with the hardware components such as the system memory and input/output devices.

In certain embodiments, the software stack further includes an HV driver 250 in, for example, the kernel. The HV driver 250 is a software program for controlling system access to the HV memory module so that the HV memory module can operate like a standard Dual In-Line Memory Module (DIMM), such as Double Data Rate (DDR) 3 registered DIMM (RDIMM), or DDR3 Load Reduction DIMM (LRDIMM), DDR4 RDIMM, or DDR4 LRDIMM, without requiring any changes to the BIOS. The HV driver 250 has access to a memory space 260 in the CPU and certain memory locations used to store lookup tables or other configuration information, which the HV driver 250 can consult with and/or update as needed. In certain embodiments, the driver intercepts certain system calls to access the HV memory module and directs the memory controller to send control, address and data signals in response to the system calls and in compliance with the memory interface standard the system is using (e.g., the Joint Electron Device Engineering Council (JEDEC) DDR3 or DDR4 RDIMM or LRDIMM Standard), as discussed in further detail below.

Figure 3:
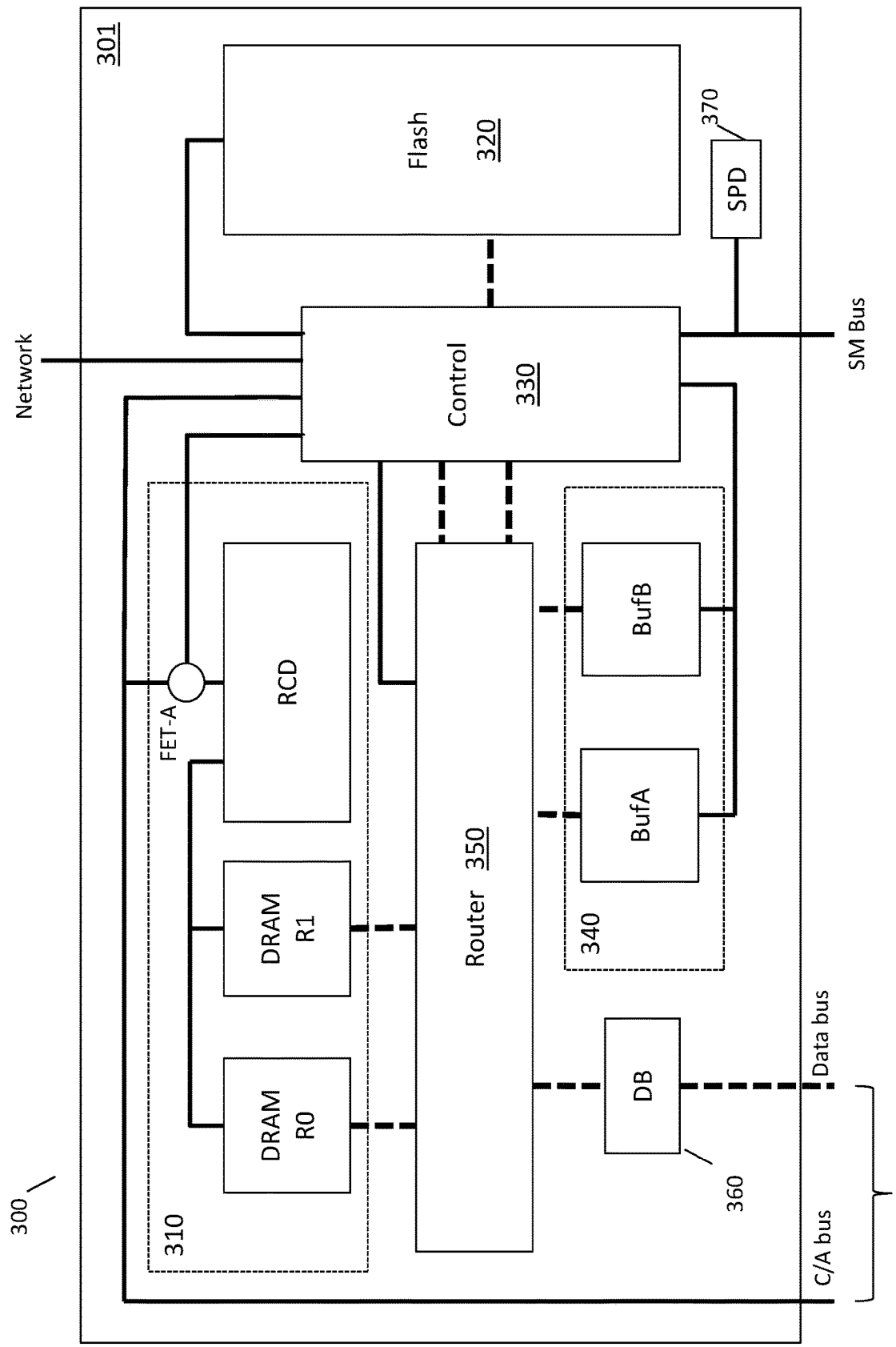
FIG. 3 is a diagrammatic representation of a memory module having both DRAM and Flash memory according to certain embodiments.

FIG. 3 is a diagrammatic representation of a Hypervault™ dual-in-line memory module (HVDIMM) 300, which can be used to provide the system memory and/or the MCS of the computer/server system 100 according to certain embodiments. As shown in FIG. 3, the HVDIMM 300 includes a volatile memory subsystem (HV-DRAM) 310, a non-volatile memory subsystem (HV-Flash 320) 320, and a module control subsystem or module controller (HV Control) 330, mounted on a module board 301, which may include one or more printed circuit boards. The HVDIMM 300 may also include buffer memory 340, and may also include a network interface controller (HV-NIC). The HVDIMM 300 may also include a data routing or router circuit 350 including, for example, switching circuits (e.g., Field-effect transistor or FET switches) and/or multiplexors, that selectively routes data signals between the HV-DRAM 310 and the system memory bus, the HV-DRAM 310 and HV Control 330, the HV-DRAM 310 and the buffer memory 340, the buffer memory 340 and the HV Control 330, and/or the buffer memory 340 and the system memory bus, under the control of the HV Control 330. The HVDIMM may further includes data buffer circuitry 360 that buffers read/write data between the system and the HVDIMM 300. The HVDIMM 300 further includes data signal lines (as represented by the dashed lines) and control/address (C/A) signals lines (as represented by the solid lines).

As shown in FIG. 3, the HVDIMM 300 is coupled to the system memory bus and may be further coupled to a system management (SM) bus using, for example, the $I^2C$ protocol or a variant thereof. The system memory bus includes control/address (C/A) signal lines and data/strobe (DQ/DQS) signal lines. The C/A signal lines are coupled to the register control device (RCD) in the HV-DRAM 310 during normal operations, and are further coupled to the HV Control 330. Thus, both the RCD and the HV Control 330 may respond to C/A signals from the system. In certain embodiments, the HV-DRAM 310 further includes a switching circuit (e.g., an FET switch, FET-A), which can be controlled by the HV Control 330 to couple the RCD to either the C/A bus and the HV Control 330 such that the HV-DRAM 310 either responds to C/A signals from the system during, for example, normal operations when the system accesses the DRAM address spaces in the HVDIMM 300, or to C/A signals from the HV Control 330 during, for example, backup/restore operations when the HVDIMM 300 backs up the content in the HV-DRAM 310 after a power failure or restore the content back into the DRAM after power is resumed.

In certain embodiments, the HV Control 330 is configured to monitor the C/A signals from the memory controller and to recognize and act upon C/A signals formulated in response to system calls to access the HV-Flash 320 and/or the buffer memory 340.

In certain embodiments, the buffer memory 340 includes DRAM, such as DRAM memory, or SRAM. The buffer memory 340 is used to temporarily store data so as to make data transfers in the buffer memory 340 faster and more efficient. Since normally data may be transferred in and out of Flash memory at a slower speed than data is transferred to and from the system, the buffer memory 340 is used to buffer data to/from the Flash memory so the system does not have to slow down and wait for data to be written to or read from the HV-Flash 320. When the system writes data to the HV-Flash 320, the data is buffered into the buffer memory 340 at DRAM data I/O speed, which is much faster than Flash data I/O speed. The buffered data can be written into the Flash memory on, for example, First-in First-out (FIFO) basis. The same is true for the read direction. Thus, while reading from the HV-Flash 320, the CPU can engage in other processes with the main memory until the buffer memory 340 has buffered a predetermined amount of data for transferring to the main memory or the system at the DRAM speed. On the other hand, when data is transferred from the main memory to the storage, the data is read from the HV-DRAM 310 according to a set of control/address (C/A) signals from the system or the HV Control 330, and written into the buffer memory 340 according to another set of C/A signals from the HV Control 330. While the DRAM can be engaged with the system on other tasks, the HV Control 330 can transfer the data from the buffer memory 340 to the HV-Flash 320 by reading the data from the buffer memory 340 and writing the data to the storage. In further embodiments, the buffer memory 340 may include two sets of buffer memory, BufA and BufB.

In certain embodiments, the HV-DRAM 310 may include multiple ranks (e.g., DRAM R1 and DRAM R2) of double data rate (e.g., DDR3 or DDR4) DRAM devices and a register control device (RCD). In certain embodiments, the HV-Flash 320 includes MLC NAND Flash, which are partitioned to support fast access as well as enhance the error correction capability for virtual duplication. In certain embodiments, the HV-FLASH 320 includes a number of (e.g., 9) standard embedded multi-media card (eMMC) packages each having an embedded multi-media interface.

In certain embodiments, the HVDIMM 300 further includes a seriel presence detect (SPD) device 370 accessible by the system via the SM bus. The SPD device 370 includes non-volatile memory such as electrically erasable and programmable read only memory (EEPROM) for storing therein key parameters of the HVDIMM 300, such as basic memory type, module data widths, timing parameters, memory density (e.g., size of each bank), manufacturer ID, serial number, etc. These key parameters are generally written by the manufacturers. During system boot up, the BIOS reads the SPD information to configure the memory controller.

The components in the HVDIMM 300, e.g., the HV Control 330, the main memory subsystem (or volatile memory subsystem), the buffer memory 340, the HV-Flash 320 (or non-volatile memory subsystem), can be mounted on a same printed circuit board or disposed in close proximity to each other to allow fast and smooth data transfer therebetween.

Figure 4:
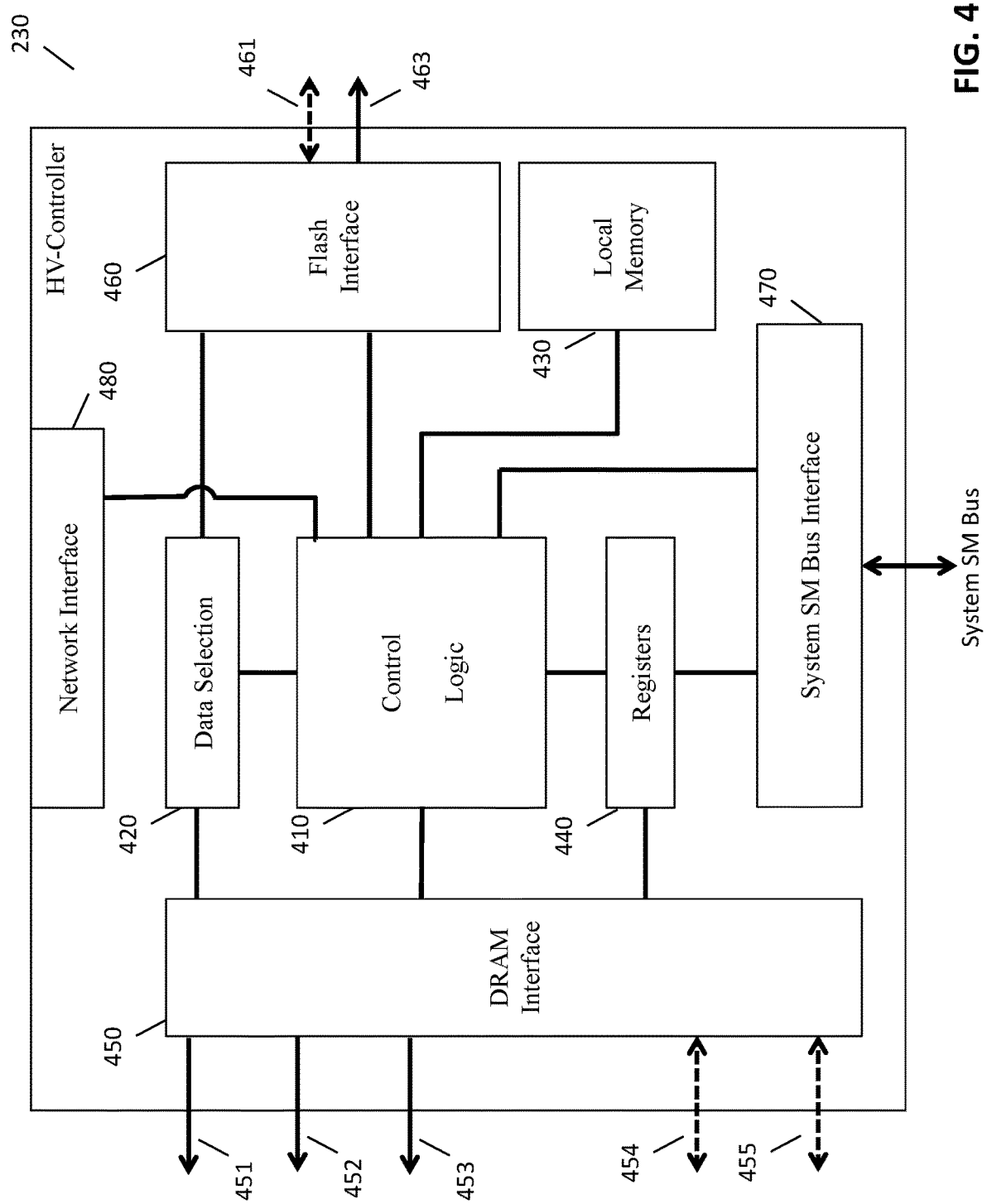
FIG. 4 is a diagrammatic representation of a module controller in the memory module according to certain embodiments.

FIG. 4 is a diagrammatic representation of the HV Control 330 according to certain embodiments. The HV Control 330 can be implemented using one or more application-specific integrated circuits (ASIC) and/or programmable field gate array (FPGA) devices. As shown in FIG. 4, the HV Control 330 includes control logic 410, a Data Selection Circuit (DSC) 420, local memory 430 and registers 440. The HV Control 330 further includes a DRAM interface 450, a Flash interface 460, a system management Bus interface 470, and a network interface 480. In certain embodiments, the HV Control 330 controls data transfers between the HV-DRAM 310 and HV-Flash 320. It keeps an address management table in the local memory on-chip memory space, operates the router 350 and the switching circuit FET-A, and generates proper commands and address signals to the HV-DRAM 310, HV-Flash 320 and the buffer memory 340 to control the data transfers therebetween.

In certain embodiments, the Flash interface is coupled to the HV-FLASH 320 via data signal lines 461 and control/address signals lines 463, the DRAM interface 450 provides multiple sets of C/A signal lines to control different DRAMs on the memory module 300 at the same time. For example, the C/A signal lines 451 is used to transmit C/A signals to the HV-DRAM 310 during backup/restore operations, and, when both BufA and BufB are provided in the buffer memory 340, C/A signal lines 452 is used to transmit C/A signals to BufA in the buffer memory 340, and the C/A signal lines 453 is used to transmit C/A signals to BufB in the buffer memory 340, so that BufA and BufB can be involved in different data transfer activities concurrently. The DRAM interface 450 also provides multiple sets of DQ/DQS signal lines (e.g., 454 and 455) that are coupled to the router 350 so that the HV Control 330 can handle multiple data transfers concurrently. For example, while data is being transferred between BufB and the HV-FLASH 320, the HV Control 330 can perform error correction on data buffered in BufA.

In certain embodiments, the HVDIMM 300 can be operated to back up data in the DRAM in response to power failure events. The HV Control 330 provides correct timings for HV-DRAM 310 to be operated in an DLL-off mode when data in the DRAM is being transferred to the Flash. The HV Control 330 also provides proper operational procedure for the back-up and restore processes. The switching circuit, FET-A, can be configured to isolate the RCD 320 and to allow the RCD 320 to receive C/A signals from the HV Control 330 during the back-up and restore processes. The HV Control 330 also controls the router 350 to route data from the HV-DRAM 310 to the HV Control 330 during backup operations and to route data from the HV Control 330 to the HV-DRAM 310 during restore operations.

In certain embodiments, the the system can access the HVDIMM 300 via the SM bus. For example, the system can use the SM bus to configure the HV Control 330 by setting certain registers in the HV Control 330. The HV Control 330 can also use the SM bus to notify the system when certain operation is completed or when an error is encountered, either using a preconfigured interrupt signal, or by updating a predefined status register in the system bus interface of the HV Control 330, or in the DMA.

In certain embodiments, the HV Control 330 also manages network interfaces between the HVDIMM 300 and any local or wide-area networks in conjunction with HV-NIC so as to facilitate direct data transfers between the HVDIMM 300 and other storage devices in the local or wide-area networks. In certain embodiments, the HV Control 330 includes a network interface and/or is coupled to a network interface card (HV-NIC), which can take the data from the HV-DRAM 310 and/or HV-Flash 320, and constructs network packets with proper source and destination addresses. In general, the source address is pre-configured by the system. In certain embodiments, the HV-NIC or network interface and some or all of the other components of the HV Control 330 can be embedded into a same ASIC or FPGA.

Figure 5:
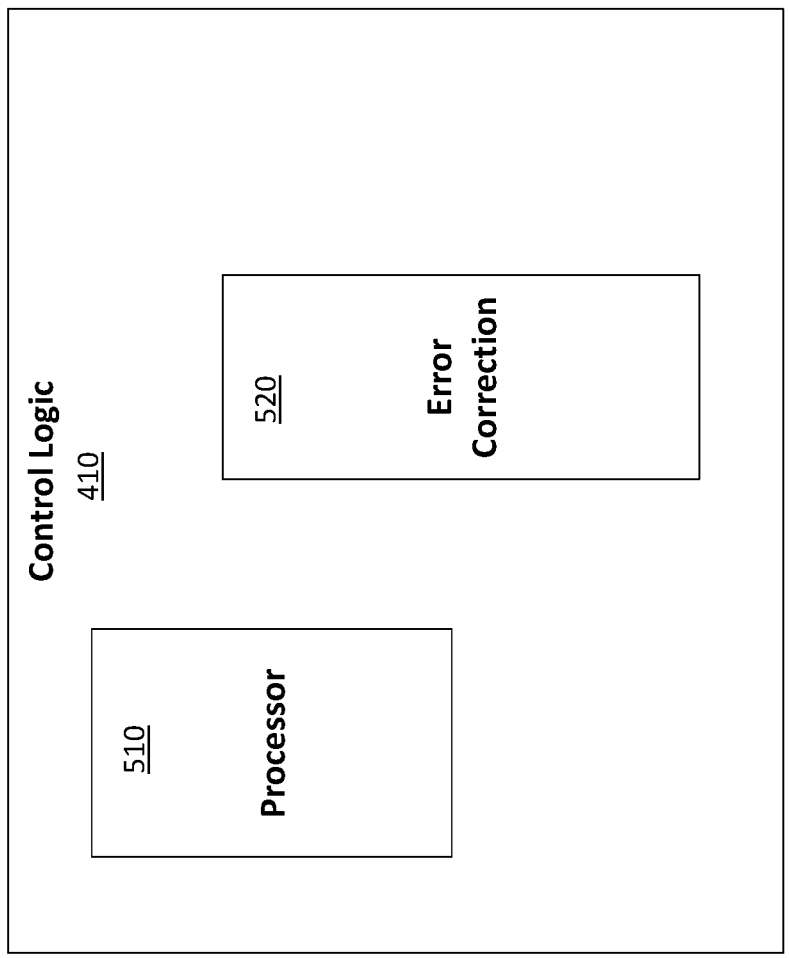
FIG. 5 is a diagrammatic representation of a control logic circuit in the module controller according to certain embodiments.

In certain embodiments, as shown in FIG. 5, the control logic 410 includes logic circuits and/or one or more processing units or processors 510 that monitors the C/A signals from the system, generates the C/A signals for the HV-DRAM 310 and/or the buffer memory 340 coupled to the DRAM interface 450 and/or the C/A signals for the HV-Flash 320 coupled to the Flash interface 460, and controls the router 350 and the switching circuit FET-A, in response to the C/A signals from the system. In certain embodiments, the logic circuits and/or processors can be configured to pre-process data being transferred from the Flash to the DRAM, so as to save DRAM memory space and reduce data traffic in the memory channel by off-loading some of the computing work traditionally done by the CPU. In certain embodiments, the HV Control 330 also includes an error correction circuit 520 executing error detection/correction routines to insure the integrity of data transferred from the HV-Flash, as discribed in U.S. patent application Ser. No. 14/536,588, filed Nov. 7, 2014, entitled "Hybrid Memory Module and System and Method of Operating the Same," which is incorporated herein by reference.

The components in the memory module, e.g., the module controller (e.g., HV Control 330), the non-volatile memory unit, the buffer memory, the ECC circuit, the NIC and the DSC, as shown in FIG. 3, can be mounted on a same printed circuit board or disposed in close proximity to each other. Or, one or more of these components can be remotely coupled to the others of these components via one or more communication channels and/or networks, such as an intranet, and/or the Internet.

Figure 6A:
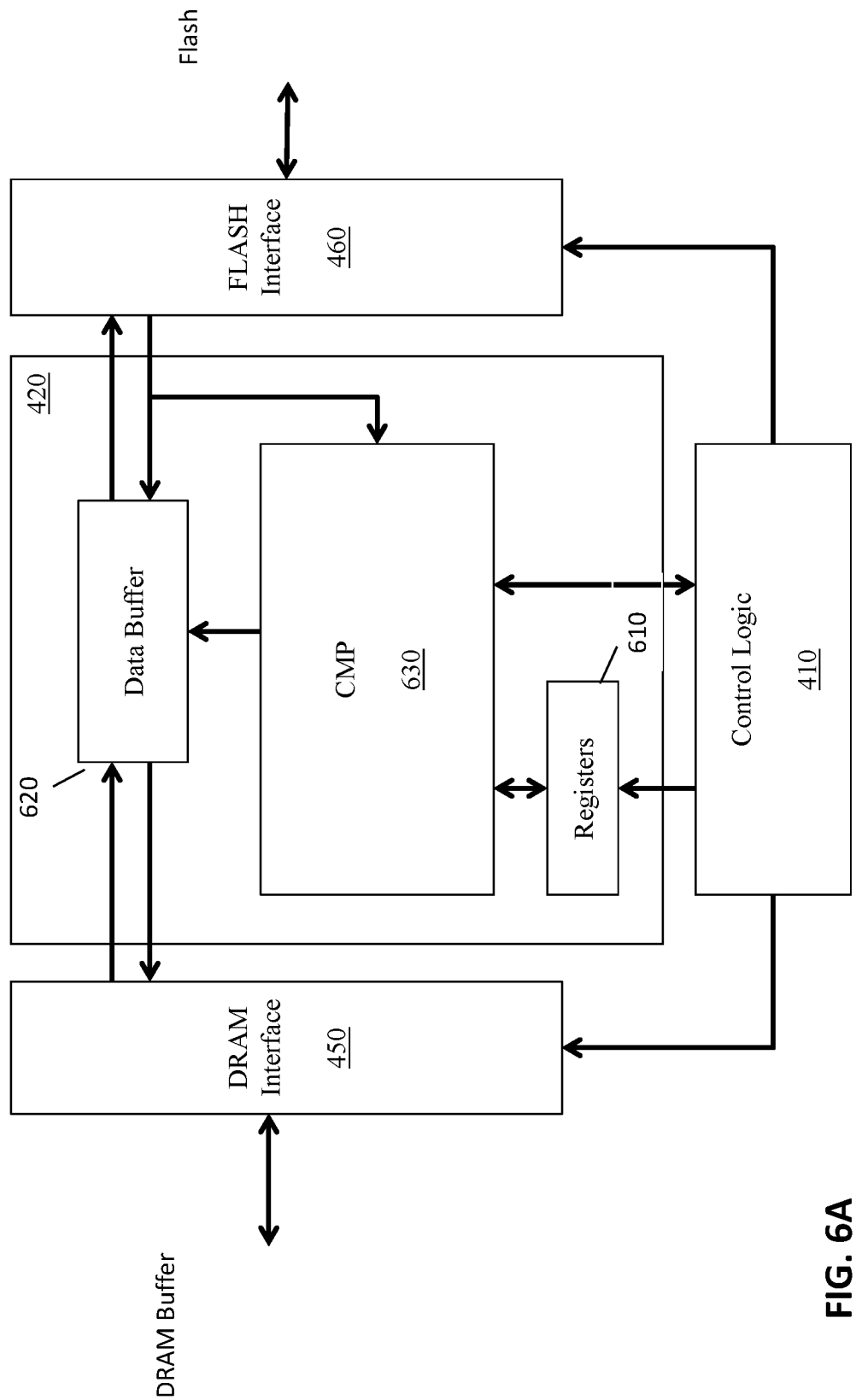
FIG. 6A is diagrammatic representation of a data selection circuit in the memory module according to certain embodiments.

FIG. 6A is a block diagram of the DSC 420 according to certain embodiments. As shown in FIG. 4, the DSC 420 is coupled to the DRAM interface 450, which sends/receives data signals to/from the DRAM buffer(s), and to the Flash interface 460, which sends/receives data signals to/from the Flash memory. The DCS 420 is also coupled to the control logic 410. The DCS 420 and the control logic 410 can be separate units coupled to each other, or integrated into a same integrated circuit or package. The DSC 420 includes on-chip storage such as registers 610 for storing search criteria, a data buffer 620, and a comparison unit (CMP) 630, which can include, for example, logic circuits and/or processing engine(s) to compare data from the Flash memory with the search criteria stored in the registers. Data from the Flash memory is provided by the Flash interface 460 to the data buffer 620 and to the CMP 630 concurrently, one segment at a time.

Figure 6B:
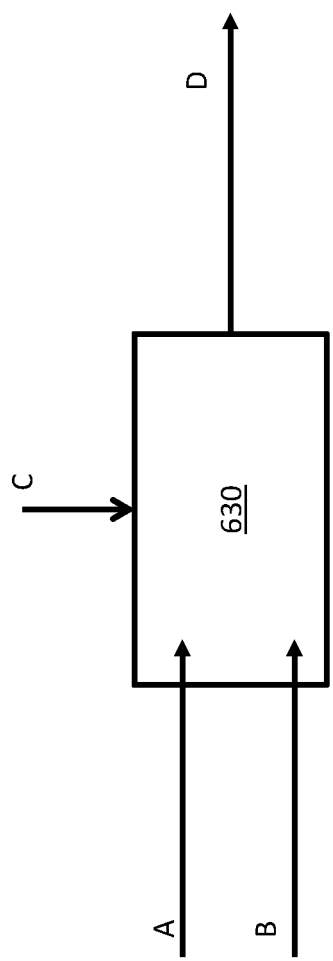
FIG. 6B is a diagrammatic representation of a comparator circuit in the data selection circuit according to certain embodiments.

As shown in FIG. 6B, CMP 630 has an input A to receive each data segment from the Flash interface 460, an input B to receive the search criteria from the registers 610, and an output D to output TRUE or FALSE depending on whether the data segment meets the criteria. The output D of the CMP 630 is coupled to both the data buffer 620 and the control logic 410. A TRUE output from the CMP 630 indicates a match and causes the control logic 410 to issue commands via the DRAM interface 450 and the data buffer 620 to release the data segment to the DRAM interface 450, which then outputs the data to the DRAM buffer(s) in response to the commands from the control logic 410. In certain embodiments, the CMP 630 is programmable via its control input C by the control logic 410.

Figure 7:
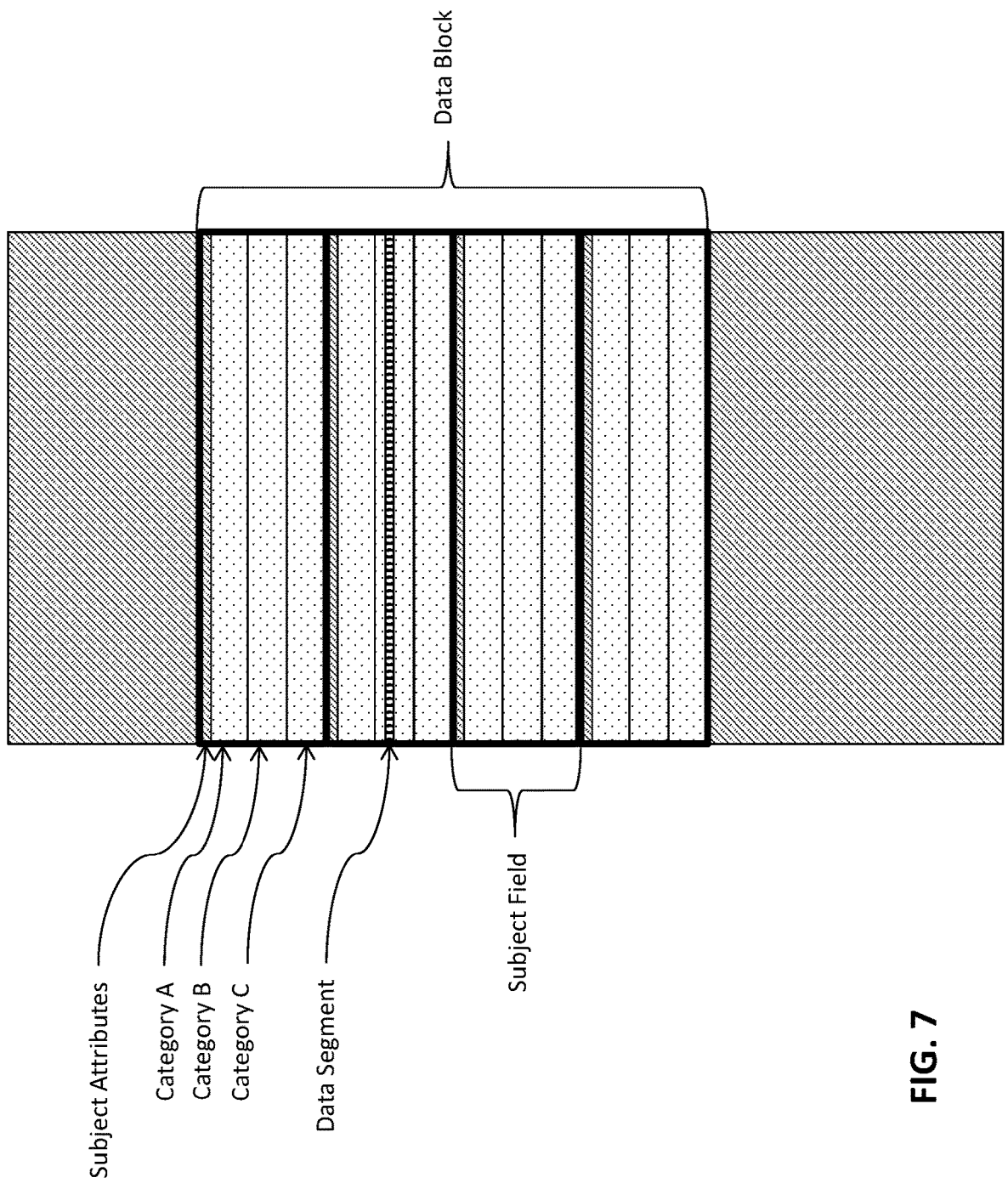
FIG. 7 is a diagrammatic representation of a data block in the Flash memory according to certain embodiments.

FIG. 7 illustrates an example of a block of data in the database. As shown in FIG. 7, the block of data includes a plurality of subject fields each storing data associated with a respective subject (e.g., a person). The data associated with each subject may include subject attributes (e.g., name, gender, age, income range, education level, etc.) and data entries categorized into multiple categories (e.g., shopping, eating out, etc.). In the category of shopping, a data entry may include one or more of a store name (in the form of, for example, data bits representing a text string), a date of visit and/or an amount spent during the visit (in the form of, for example data bits representing a value), etc. In the category of eating out, a data entry may include one or more of a restaurant name, data of dining, amount spent dining, etc.

Thus, if the CPU is to search the database for data associated with people visiting a certain store, the CPU can provide the search criteria to the module controller 330, which can include, for example, the category, a text string representing the name of the store, and/or a value representing a date of visit or an amount spent during the visit. The module controller 330 would store the search criteria in the registers in or accessible by the Data Selection Circuit. As data segments associated with the data entries are being moved from the Flash memory to the DRAM buffer, the CMP unit 630 compares the category and content of each data segment with the search criteria stored in the registers. In certain embodiments, the CMP 630 includes logic circuits to compare information in the data segments with the search criteria and to select data segments including information that are relevant to the search criteria for output to the data buffer or DRAM buffer(s). In certain embodiments, the CMP unit 630 perform the comparison and data selection on-the-fly. Thus, the CMP 630 adds little, if any, latency to the data transfer process from FLASH to DRAM buffer. Various types of implementations for such processing engine may be chosen by persons of ordinary skill in the art to meet certain system specifications or other requirements.

In certain embodiments, the CMP unit 630 is configured to compare the category and content of each data segment with the search criteria using fuzzy logic. Thus, the CMP 630 may find a match where a preset percentage (e.g., 90%) of the data segment matches the search criteria, or either the search criteria or the data segment has one or more misspelled words or contain information that is possibly relevant to the search criteria (e.g., synonyms of or words that contain a same base word as a word in the search criteria). By employing fuzzy logic or executing search algorithms in the CMP 630, the CMP is unlikely to filter out relevant entries.

Figure 8:
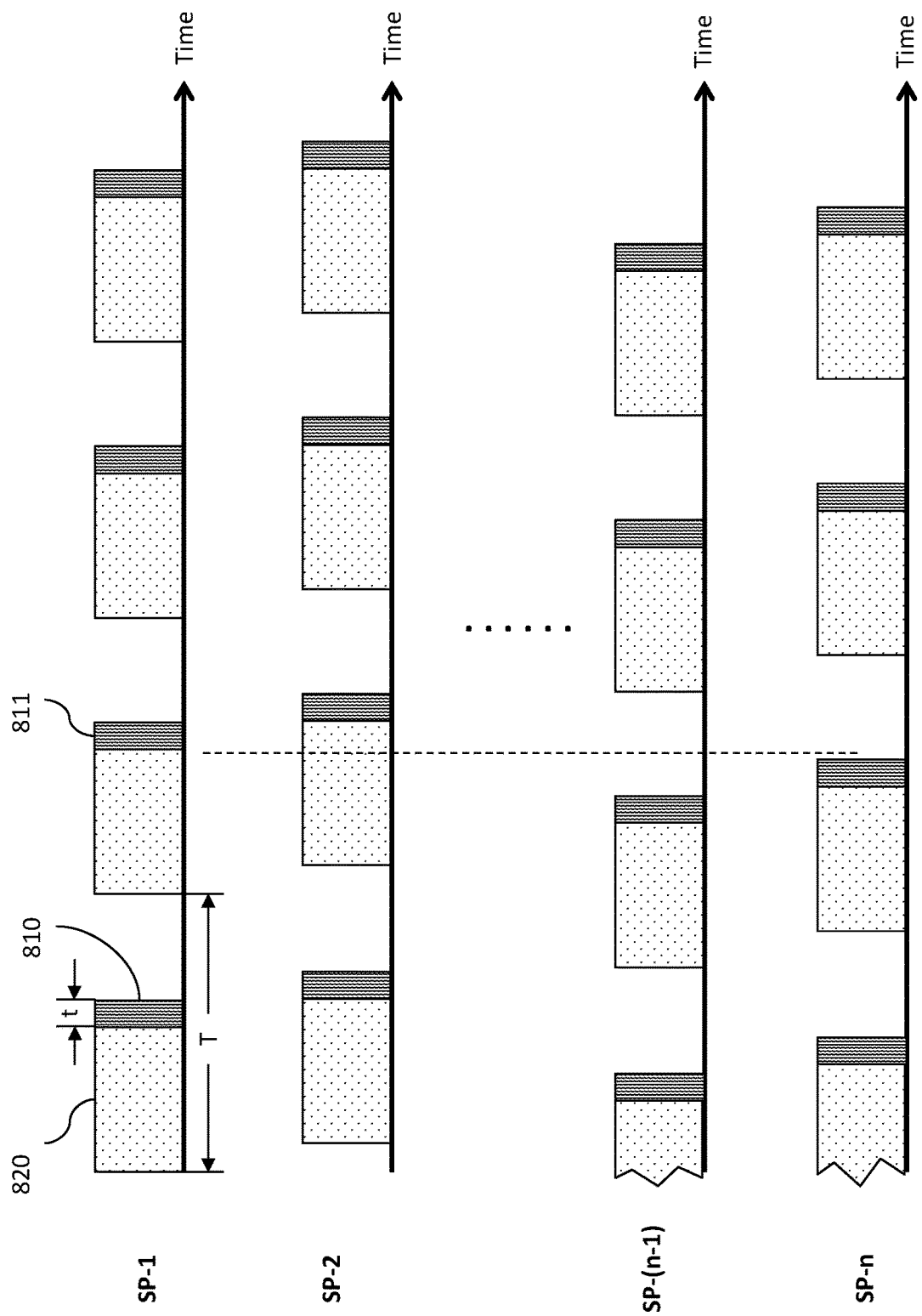
FIG. 8 is a diagrammatic representation illustrating a process that straddles a number of search processes according to certain embodiments.

In certain embodiments, the CMP unit 630 is further configured to block data segments not relevant to the search criteria from being output to the data buffer. By not outputting data segments that do not contain information relevant to the search criteria to the data buffer, significantly less amount of data would need to be loaded in the main memory for processing by the CPU, further freeing up the memory channel for other tasks. Thus, the time the CPU needs to load and search each block of Flash memory is significantly reduced because only a small portion of each block of Flash memory in the search database needs to be manipulated and searched by the CPU. For example, in a conventional computer or server system, the CPU may need time T to load and search a block of memory. In a computer system according to one embodiment, as shown in FIG. 8, the CPU may only need time t, which can be a small portion of the time T, as indicated by the time interval 810, to load and search a block of memory. The time interval 820 before the time interval 810 is used by the memory module to presearch the block of memory, as described above, which does not require CPU involvement.

Thus, the CPU can use the time before and/or after the time interval 810 to perform other tasks. For example, as also shown in FIG. 8, the CPU can straddle a number of (e.g., n) search processes, SP-1, SP-2, . . . , SP-n, involving multiple memory modules or a memory module having multiple CMP units so that each may pre-search using different search query on the same or different database. Thus, while the CPU loads and searches the buffered data from one of the memory modules or CMP unit, other memory modules or CMP units can perform their respective presearching activities. Because of the much reduced time to load and search relevant entries in one block of memory for each of the multiple search processes, the CPU may be able to load and search a block of memory from each of the multiple search processes in the same amount of time T, which the CPU would need to load and search one block of memory for a single search process in a conventional computer or server system. Thus, the CPU efficiency can be greatly increased in the computer or server system according to certain embodiments.

Figure 9:
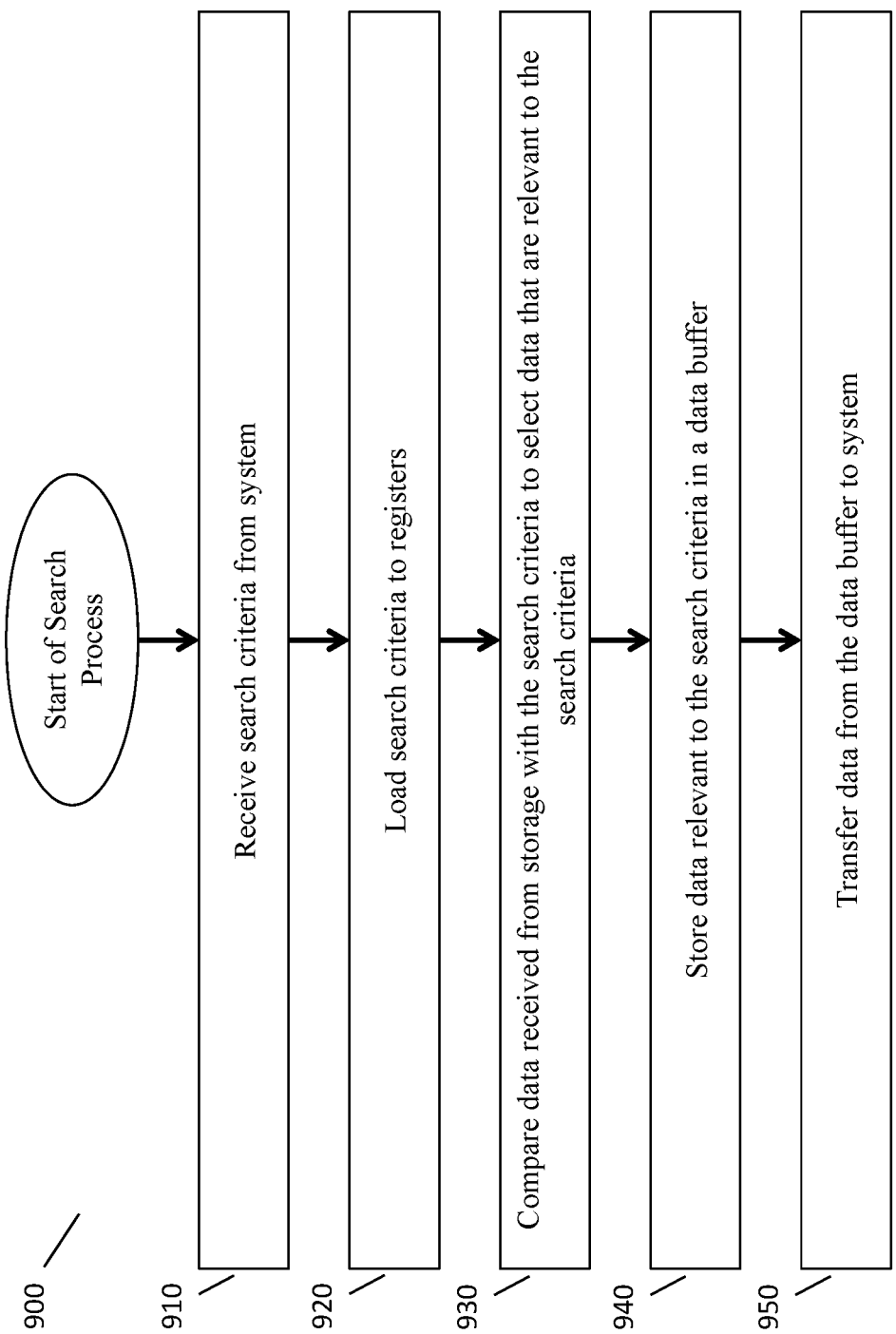
FIG. 9 is a flow chart illustrating a method of data transfer performed by the memory module according to one embodiment.

FIG. 9 is a flow chart illustrating a method of data transfer performed by the memory module according to one embodiment. As shown in FIG. 9, at the start of a search process, the memory module receives (910) search criteria and other instructions (e.g., an address range to be searched, etc.) from the system (e.g., the CPU) and load (920) the search criteria into registers. The memory module then moves data segments from the Flash memory to the CMP unit, which selects (930) data segments that include information relevant to the search criteria. The selected data entries are stored (940) in a data buffer, which can be the DRAM buffer(s) or the data buffer 620 in the Data Selection Circuit 420. The CMP unit may also be used to perform error correction or ECC generation. When a certain amount of data has been buffered in the DRAM buffer, the memory module transfers (950) the data to system. The Data Selection Circuit may keep a record of an amount of data entries having been transferred to the data buffer and alert the module controller when the amount has reached a preset limit. The module controller can instruct the DRAM buffer to transfer the buffered data entries to the system. Or, the module controller can wait for instructions from the system on when to transfer the buffered data and instruct the DRAM accordingly. For examples, when the CPU straddles multiple search processes involving multiple memory modules, the memory modules can take turns providing data to the CPU in response to instructions or control signals from the CPU, as illustrated in FIG. 8.

Figure 10:
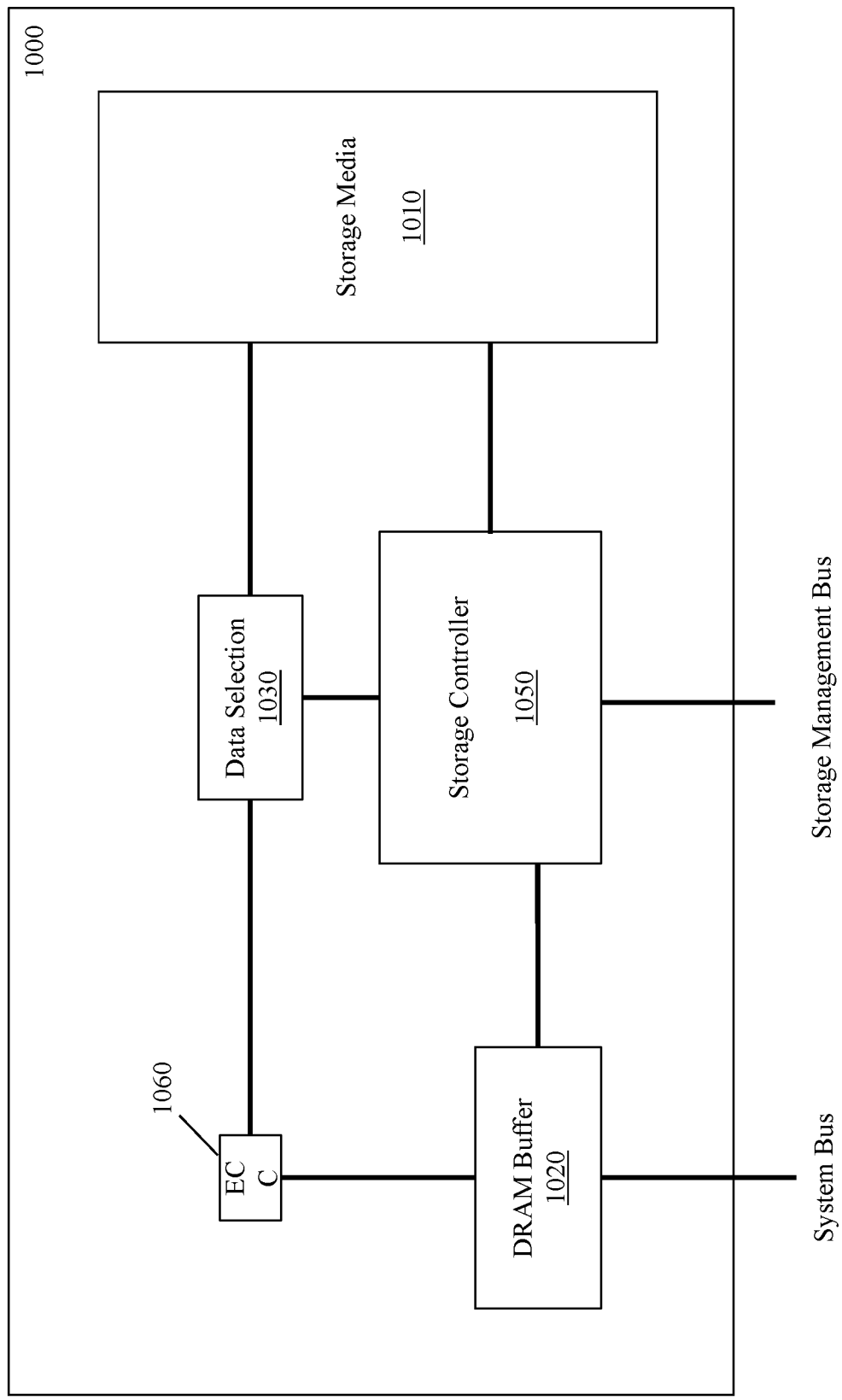
FIG. 10 is a diagrammatic representation of a storage subsystem including storage media, a storage controller and a Data Selection Circuit to pre-select outgoing data from the storage media according to certain embodiments.

FIG. 10 is a block diagram of a storage subsystem or device 1000 coupled to the system memory bus directly or indirectly, e.g., through the south bridge, the PCI bus, and/or the north bridge in the computer system 100, according to certain embodiments. As shown in FIG. 10, the storage device includes a storage medium 1010 (e.g., a hard disk platter, solid state memory or Flash, etc.). The storage module may also include buffer memory 1020, for example, a DRAM buffer, which can be used to buffer writes to, and/or reads from, the storage medium. The buffer memory 1020 is coupled directly or indirectly to the system bus. The storage device further includes a Data Selection Circuit 1030 similar to the DSC 420 coupled between the storage media and the buffer memory and a storage controller 1050. In certain embodiments, the storage medium 1010 includes, for example, 256 GB/512 GB of MLC NAND Flash, which are partitioned to support fast access as well as enhance the error correction capability for virtual duplication. In certain embodiments, the storage subsystem 1000 further includes an ECC circuit 1060, which is coupled between the Data Selection Circuit 1030 and the buffer memory 1020. The ECC circuit can also be included in the Data Selection Circuit 1030.

In certain embodiments, the storage controller 1050 is made of, for example, an application-specific integrated circuit (ASIC) device or a programmable field gate array (FPGA) device, which controls the data transfers between the storage medium 1010 and the buffer memory 1020, the Data Selection Circuit 1030, and data input/output to/from the buffer memory 1020, in response to system commands received via, for example, a storage management (SM) bus. The storage controller 1050 also receives presearch criteria from the system and provides the presearch criteria to the Data Selection Circuit 1030. In certain embodiments, the Data Selection Circuit 1030 is part of the storage controller 1050 and is built together with the storage controller on a same integrated circuit or packaged with the storage controller in a same integrated circuit package.

The buffer memory 1020 is used to temporarily store data so as to make I/O operations of the storage subsystem faster and more efficient. Since normally data may be transferred in and out of the storage medium 1010 at a slower speed than data is transferred to and from the system, the buffer memory is used to buffer data to/from the storage medium so the system does not have to slow down and wait for data to be written to or read from the storage subsystem. When the system writes data to the storage subsystem, the data is buffered into the buffer memory 1020 at, for example, DRAM data I/O speed, which is much faster than Flash data I/O speed. The buffered data is written into the storage medium 1010 on a, for example, first in, first out basis. The same is true for the read direction. Thus, while reading from the storage subsystem, the CPU can engage in other processes until the buffer memory 1020 has buffered a predetermined amount of data for transferring to the system at the DRAM speed.

In certain embodiments, the Data Selection Circuit 1030 pre-selects data transferred out of the storage medium 1010 and provided to the Data Selection Circuit 1030 by the storage controller 1050. The preselected data are buffered in the Data Selection Circuit 1030 until the storage controller 1050 moves the preselected data into the buffer memory 1020. The storage controller 1050 may include a microprocessor to deconstruct data from the storage medium 1010 into data segments that can be compared with one or more selection criteria by the CMP unit in the Data Selection Circuit 1030. Data segments determined to be irrelevant to the data selection criteria are ignored and not buffered in the buffer memory for later retrieval and processing by the computer system CPU.

Figure 11:
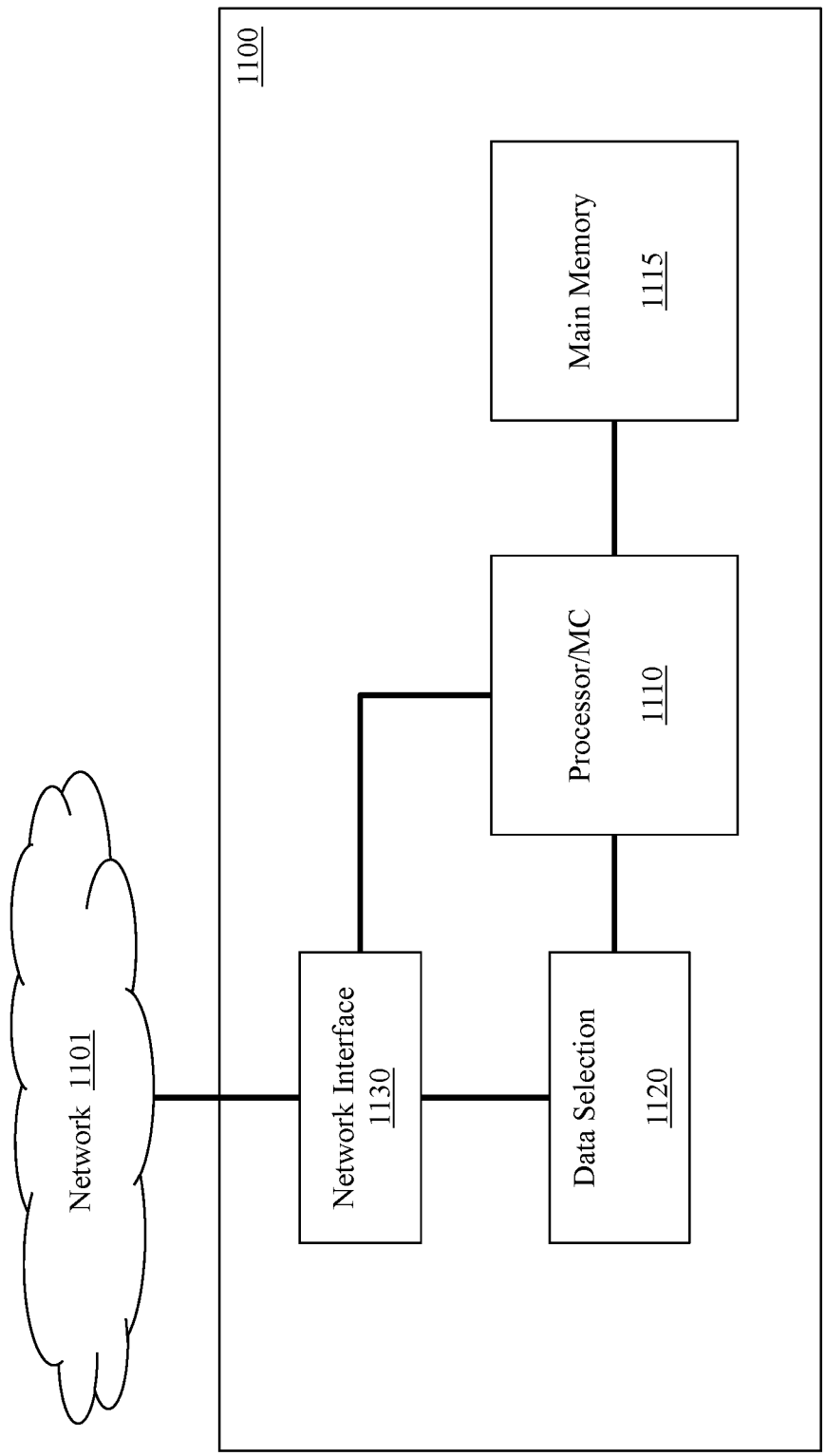
FIG. 11 is a diagrammatic representation of computer/server system including a network interface that handles data input/output between the system and a network, and a Data Selection Circuit coupled to the network interface to pre-select incoming data from the network according to certain embodiments.

In further embodiments, a Data Selection Circuit (e.g., DSC 420) can be located in other parts of the computer/server system instead of or in addition to the memory modules and/or the storage subsystems. For example, as shown in FIG. 11, a computer/server system 1100 includes a processor 1110, main memory 1115, a Data Selection Circuit 1120 similar to the DSC 420, and a network interface 1110 that handles data input/output between the system and a network 1101 (e.g., Ethernet network), and the Data Selection Circuit 1120 can be coupled to the network interface 1130 to pre-select incoming data from a network. The preselected data are buffered in the Data Selection Circuit 1120 until the processor 1110 gets around to take care of loading the preselected data into the main memory 1115. Depending on the type of network protocol involved, the network interface 1130 may include a network processor to deconstruct incoming network data according to the network protocol into data segments that can be compared with one or more selection criteria by the CMP unit in the Data Selection Circuit 1120. For example, the network data may come in data packets, each including a source address, destination address, data and cyclic redundancy code (CRC). The network interface may examine each data packet to filter out data packets with the destination addresses of other computer systems. The network interface then checks the data extracted from the data packets with the correct destination address using the associated CRC, and corrects any errors in the data. The corrected data are constructed into data segments for comparing with the data selection criteria. Data segments determined to be irrelevant to the data selection criteria are ignored and not buffered for later processing by the CPU.

We claim:

1. A memory module operable in a computer system having a memory controller coupled to a system bus, the system bus including a data bus and a control/address (C/A) bus, comprising:
    a printed circuit board;
    a volatile memory subsystem on the printed circuit board, the volatile memory subsystem including double data rate dynamic random access memory (DRAM) devices and configurable to receive or output data in response to receiving C/A signals for a memory write or read operation;
    a non-volatile memory subsystem on the printed circuit board and configurable to serve as storage for the computer system;
    a module controller on the printed circuit board, coupled to the volatile memory subsystem, the non-volatile memory subsystem, and the system bus, and configurable to control intra-module data transfer operations to transfer data between the volatile memory subsystem and the non-volatile memory subsystem; and
    data routing circuitry controllable by the module controller to selectively route first data associated with system memory read or write operations between the DRAM devices and the system bus, or second data associated with intra-module data transfer operations between the DRAM devices and the module controller;
    wherein the intra-module data transfer operations include a pre-search operation to transfer data relevant to one or more selection criteria from the non-volatile memory subsystem to the volatile memory subsystem; and
    wherein, during the pre-search operation, the module controller is further configurable to read a set of data segments from the non-volatile memory, to check the set of data segments with respect to the one or more selection criteria to determine whether any data segment in the set of data segments is relevant to the one or more selection criteria, and, if one or more data segments of the set of data segments are determined to be relevant to the one or more selection criteria, to provide the one or more data segments to the DRAM devices via the data routing circuitry in response to receiving C/A signals related to the pre-search operation via the C/A bus.

2. The memory module of claim 1, wherein module controller is further configurable to read the set of data segments from the non-volatile memory subsystem in response to receiving via the system bus a system request for the pre-search operation, the system request including the one or more selection criteria.

3. The memory module of claim 2, wherein the volatile memory subsystem is configurable to perform one or more system memory read or write operations concurrently with the module controller reading the set of data segments from the non-volatile memory subsystem.

4. The memory module of claim 3, wherein, after receiving the system request, the module controller is further configurable to receive via the C/A bus C/A signals associated with the one or more system memory read or write operations, and to operate the data routing circuitry to route data associated with the one or more system memory read or write operations between the DRAM devices and the data bus in response to the C/A signals associated with the one or more system memory read or write operations.

5. The memory module of claim 4, wherein the module controller is further configurable to, in response to receiving via the C/A bus the C/A signals related to the pre-search operation, operate the data routing circuitry to route data signals carrying the one or more data segments of the set of data segments from the module controller to the DRAM devices.

6. The memory module of claim 1, wherein the volatile memory subsystem is configurable to perform one or more system memory read or write operations concurrently with the module controller checking the set of data segments with respect to the one or more selection criteria.

7. The memory module of claim 6, wherein the module controller is further configurable to operate the data routing circuitry to route data associated with the one or more system memory read or write operations between the DRAM devices and the data bus in response to receiving via the C/A bus C/A signals associated with the one or more system memory read or write operations.

8. The memory module of claim 7, wherein the module controller is further configurable to operate the data routing circuitry to route data signals carrying the one or more data segments of the set of data segments from the module controller to the DRAM devices in response to receiving via the C/A bus the C/A signals related to the pre-search operation.

9. The memory module of claim 1, wherein the volatile memory subsystem is configurable to receive via the C/A bus the C/A signals related to the pre-search operation and to receive via the data routing circuitry the one or more data segments in response to the C/A signals related to the pre-search operation.

10. The memory module of claim 1, further comprising buffer memory, wherein:
the buffer memory includes DRAM devices configurable to store at least the one or more data segments of the set of data segments;
the module controller is further configurable to, before receiving the C/A signals related to the pre-search operation, write the one or more data segments of the set of data segments into the buffer memory;
the module controller is further configurable to read the one or more data segments from the buffer memory before providing the one or more data segments to the DRAM devices in the volatile memory subsystem; and
the volatile memory subsystem is configurable to perform one or more system memory read or write operations concurrently with the module controller writing the one or more data segments into the buffer memory and/or reading the one or more data segments from the buffer memory.

11. The memory module of claim 10, wherein the module controller includes an integrated circuit mounted on the printed circuit board.

12. The memory module of claim 11, wherein the integrated circuit includes a first DRAM interface and a second DRAM interface, the first DRAM interface including first C/A signal lines and first data signal lines coupled to the volatile memory subsystem, the second DRAM interface including second C/A signal lines and second data signal lines coupled to the buffer memory.

13. A method, comprising:
at a memory module coupled to a memory controller via a system memory bus, the system bus including a data bus and a control/address (C/A) bus, the memory module including a printed circuit board, a volatile memory subsystem on the printed circuit board, and a non-volatile memory subsystem on the printed circuit board, the volatile memory subsystem including double data rate dynamic random access memory (DRAM) devices and configurable to receive or output data in response to receiving C/A signals, the non-volatile memory subsystem serving as storage for the computer system,
performing one or more system memory read or write operations, including: operating data routing circuitry to route first data associated with the memory read or write operations between the DRAM devices and the system bus, the first data being received or output by the volatile memory subsystem in response to first C/A signals transmitted by the memory controller to the memory module via the C/A bus; and
performing a presearch operation to transfer second data relevant to one or more selection criteria from the non-volatile memory subsystem to the volatile memory subsystem, including: reading a set of data segments from the non-volatile memory, checking the set of data segments with respect to the one or more selection criteria to determine whether any data segment in the set of data segments is relevant to the one or more selection criteria, operating the data routing circuitry to route one or more data segments of the set of data segments to the DRAM devices in response to receiving via the C/A bus second C/A signals related to the pre-search operation, the one or more data segments having been determined to be relevant to the one or more selection criteria.

14. The method of claim 13, wherein the set of data segments is read from the non-volatile memory subsystem in response to receiving via the system bus a system request for the pre-search operation, the system request including the one or more selection criteria.

15. The method of claim 13, wherein the first data is received or output by the volatile memory subsystem concurrently with the set of data segments being read from the non-volatile memory subsystem.

16. The method of claim 13, wherein the data routing circuitry is operated to route the first data associated with the one or more system memory read or write operations between the DRAM devices and the data bus in response to the first C/A signals.

17. The method of claim 13, wherein the first data is received or output by the volatile memory subsystem concurrently with the set of data segments being checked with respect to the one or more selection criteria.

18. The method of claim 17, wherein the data routing circuitry is operated to route the first data associated with the one or more system memory read or write operations between the DRAM devices and the data bus in response to the first C/A signals.

19. The method of claim 13, wherein the memory module further comprises buffer memory, the buffer memory including DRAM devices, the method further comprising:
writing at least the one or more data segments into the buffer memory before receiving via the C/A bus the second C/A signals related to the pre-search operation;
reading the one or more data segments from the buffer memory before providing the one or more data segments to the DRAM devices in the volatile memory subsystem; and
performing the one or more system memory read or write operations concurrently with writing the one or more data segments into the buffer memory and/or reading the one or more data segments from the buffer memory.

20. The method of claim 13, further comprising:
receiving, by the volatile memory subsystem, the second C/A signals; and
receiving, by the volatile memory subsystem, the one or more data segments in response to the second C/A signals.

* * * * *